(12) United States Patent
Nomura et al.

(10) Patent No.: US 10,017,919 B2
(45) Date of Patent: Jul. 10, 2018

(54) CONSTRUCTION MANAGEMENT DEVICE FOR EXCAVATION MACHINERY, CONSTRUCTION MANAGEMENT DEVICE FOR EXCAVATOR, EXCAVATION MACHINERY, AND CONSTRUCTION MANAGEMENT SYSTEM

(71) Applicant: Komatsu Ltd., Tokyo (JP)

(72) Inventors: Azumi Nomura, Fujisawa (JP); Ryo Fukano, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/233,498

(22) PCT Filed: Sep. 2, 2013

(86) PCT No.: PCT/JP2013/073573
§ 371 (c)(1),
(2) Date: Jan. 17, 2014

(87) PCT Pub. No.: WO2014/167740
PCT Pub. Date: Oct. 16, 2014

(65) Prior Publication Data
US 2016/0024757 A1 Jan. 28, 2016

(30) Foreign Application Priority Data
Apr. 10, 2013 (JP) .................... 2013-082517

(51) Int. Cl.
*E02F 9/26* (2006.01)
*E02F 3/28* (2006.01)
(Continued)

(52) U.S. Cl.
CPC .................. *E02F 9/26* (2013.01); *E02F 3/28* (2013.01); *E02F 3/435* (2013.01); *E02F 9/2054* (2013.01);
(Continued)

(58) Field of Classification Search
CPC ... E02F 9/26; E02F 9/261; E02F 9/264; E02F 3/28; E02F 3/283; E02F 3/30; E02F 7/02;
(Continued)

(56) References Cited

U.S. PATENT DOCUMENTS 5,471,391 A * 11/1995 Gudat .................. E01C 19/004
340/995.1
5,612,864 A * 3/1997 Henderson .............. E02F 3/847
356/3.01
(Continued)

FOREIGN PATENT DOCUMENTS

CN 1738947 A 2/2006
CN 1740462 A 3/2006
(Continued)

OTHER PUBLICATIONS

International Search Report dated Nov. 26, 2013, issued for PCT/JP2013/073573.

*Primary Examiner* — Thomas G Black
*Assistant Examiner* — Sara J Lewandroski
(74) *Attorney, Agent, or Firm* — Locke Lord LLP

(57) ABSTRACT

A construction management device generates construction information for an excavation machinery having a work machine, a swing body to which the work machine is attached, and a traveling body traveling with the swing body mounted thereon. The construction management device includes a work machine position information generation part determining work machine position information as information on a position of the work machine; a traveling body position information generation part determining traveling body position information as information on a position of the traveling body; and a construction position information generation part using either the work machine position information or the traveling body position information to generate construction position information as information
(Continued)

on a position of construction by the excavation machinery, and while the excavation machinery travels, using not the work machine position information, but the traveling body position information to generate the construction position information.

11 Claims, 15 Drawing Sheets

(51) Int. Cl.
    *E02F 3/43*     (2006.01)
    *E02F 9/20*     (2006.01)
    *G01C 21/04*     (2006.01)
    *G01S 19/14*     (2010.01)

(52) U.S. Cl.
    CPC .............. *E02F 9/261* (2013.01); *E02F 9/264* (2013.01); *G01C 21/04* (2013.01); *G01S 19/14* (2013.01)

(58) Field of Classification Search
    CPC ........... E02F 7/026; E02F 9/262; E02F 9/265; G07C 5/00; G07C 5/02
    USPC .......................................................... 701/50
    See application file for complete search history.

(56) References Cited

U.S. PATENT DOCUMENTS

| | | | | |
|---|---|---|---|---|
| 5,631,658 | A * | 5/1997 | Gudat | A01B 79/005 342/357.31 |
| 5,925,085 | A * | 7/1999 | Kleimenhagen | E01C 19/004 37/348 |
| 6,047,227 | A * | 4/2000 | Henderson | E02F 9/2045 172/4.5 |
| 6,701,239 | B2 * | 3/2004 | Keefer | E02F 3/842 37/414 |
| 6,766,600 | B2 * | 7/2004 | Ogura | E02F 9/2296 37/348 |
| 7,079,931 | B2 * | 7/2006 | Sahm | E02F 3/431 37/414 |
| 2005/0027420 | A1 * | 2/2005 | Fujishima | E02F 9/2045 701/50 |
| 2006/0026101 | A1 * | 2/2006 | Ogura | G07C 3/08 705/50 |
| 2007/0010925 | A1 | 1/2007 | Yokoyama et al. | |
| 2007/0142989 | A1 * | 6/2007 | Koehrsen | G01S 5/0072 701/50 |
| 2009/0043462 | A1 * | 2/2009 | Stratton | E02F 9/2033 701/50 |
| 2009/0076674 | A1 * | 3/2009 | Kiegerl | E02F 1/00 701/26 |
| 2009/0202109 | A1 * | 8/2009 | Clar | G01C 15/00 382/104 |
| 2009/0219199 | A1 * | 9/2009 | Borchert | E02F 9/26 342/357.31 |
| 2009/0326734 | A1 * | 12/2009 | Gudat | E02F 9/2054 701/2 |
| 2010/0046800 | A1 * | 2/2010 | Clark | E02F 9/26 382/106 |
| 2010/0139131 | A1 | 6/2010 | Kirian | |
| 2010/0250123 | A1 * | 9/2010 | Leman | E02F 3/651 701/532 |
| 2011/0056099 | A1 | 3/2011 | Paull | |
| 2012/0136525 | A1 * | 5/2012 | Everett | E02F 9/2045 701/24 |
| 2012/0330550 | A1 * | 12/2012 | Jensen | G09B 25/06 702/5 |
| 2013/0158785 | A1 | 6/2013 | Fukano et al. | |
| 2014/0064897 | A1 * | 3/2014 | Montgomery | E02F 3/434 414/685 |
| 2014/0222301 | A1 | 8/2014 | Paull | |
| 2014/0237866 | A1 | 8/2014 | Paull | |
| 2015/0081176 | A1 | 3/2015 | Paull | |
| 2015/0292179 | A1 * | 10/2015 | Joergensen | G01C 15/004 701/50 |
| 2015/0345114 | A1 * | 12/2015 | Nomura | E02F 3/3677 37/379 |
| 2015/0354178 | A1 * | 12/2015 | Jeong | E02F 9/267 340/438 |
| 2015/0361642 | A1 * | 12/2015 | Stratton | G05D 1/0274 701/461 |
| 2016/0282878 | A1 * | 9/2016 | Stratton | G05D 1/0274 |

FOREIGN PATENT DOCUMENTS

| | | |
|---|---|---|
| GB | 2413314 A | 10/2005 |
| JP | 2007-147588 A | 6/2007 |
| JP | 2012-172428 A | 9/2012 |
| JP | 2012-255286 A | 12/2012 |
| WO | WO-2011/029068 A2 | 3/2011 |

* cited by examiner

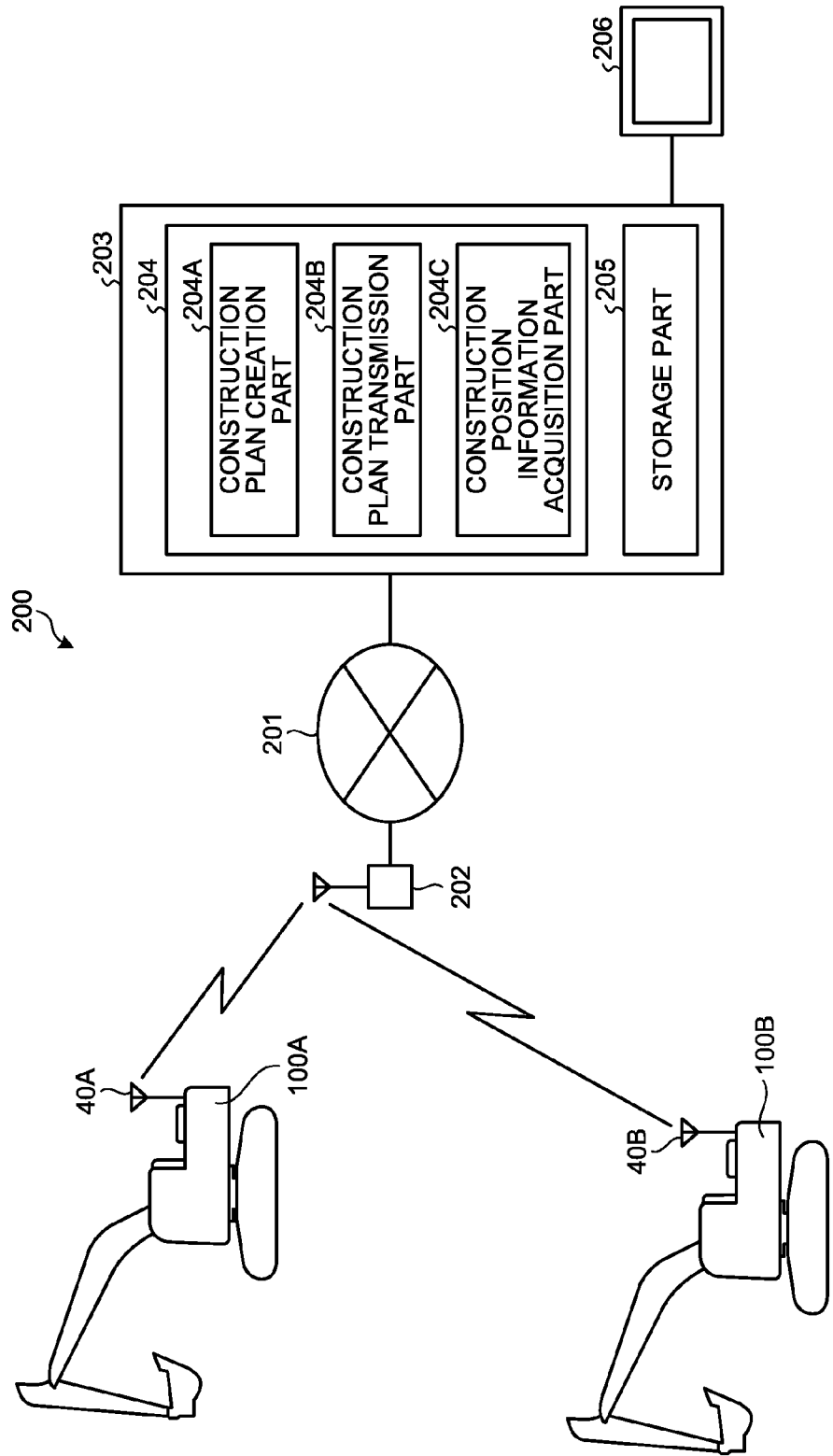

CONSTRUCTION MANAGEMENT DEVICE FOR EXCAVATION MACHINERY, CONSTRUCTION MANAGEMENT DEVICE FOR EXCAVATOR, EXCAVATION MACHINERY, AND CONSTRUCTION MANAGEMENT SYSTEM

FIELD

The present invention relates to construction management devices for excavation machinery, excavation machinery, and construction management systems.

BACKGROUND

In recent years, there have been suggested work machines such as excavators and bulldozers equipped with GPS (global positioning system) or the like to detect their locations, compare positional information from the GPS with construction information indicating landforms of construction sites to determine the postures of the work machines by computing processes and control the motion of the work machines, or compares the postures or positions of the work machines with the construction information and display guidance about the construction status on a monitoring device (for example, refer to Patent Literatures 1 and 2). Construction work using such work machines is called computerized construction. According to the computerized construction, even inexperienced operators of work machines can carry out high-accuracy construction work. Skilled operators can perform high-efficiency construction work by computerized construction. According to the computerized construction, it is possible to significantly reduce conventionally required land surveys and finishing stake settings.

CITATION LIST

Patent Literatures

Patent Literature 1: Unexamined Japanese Patent Application No. 2007-147588
Patent Literature 2: Unexamined Japanese Patent Application No. 2012-172428

SUMMARY

Technical Problem

The landform of a construction site, that is, the shape of a construction target is changed by construction work. To grasp the change, it is necessary to survey the shape of the construction target after the construction, but the survey work is burdensome. In addition, information on the construction result, that is, the shape of the construction target is preferably accurate. Patent Literature 1 sets forth that a pilot pressure of an operation lever is detected to determine on whether or not to travel a work machine, and switch low-pass filters to determine and adjust a bucket leading end position. Patent Literature 2 describes a current state line detection part that detects a current-state surface line according to the locus of movement of the bottom part of a vehicle main body and the locus of movement of a leading end of a bucket.

Excavation machinery with a work machine such as an excavator generally conducts excavation work at a fixed position and travels with the work machine stopped. Patent Literature 1 does not describe that the current shape of a construction target is determined while the excavation machinery travels. Thus, when a construction target is constructed using the excavation machinery according to the technique disclosed in Patent Literature 1, the construction result cannot be achieved with accuracy. Patent Literature 2 does not clearly describe how to use the lotus of movement of the bottom part of the vehicle main body and the lotus of movement of the leading end of the bucket to detect the current-state surface line. Thus, according to the technique disclosed in Patent Literature 2, the current-state surface line may be detected using the lotus of the leading end of the bucket while the excavation machinery travels or may be detected by movement of the bottom part of the vehicle main body during the excavation work, whereby the construction result cannot be achieved with accuracy.

An object of the present invention is to make it possible to achieve accurate construction results in computerized construction using excavation machinery with a work machine.

Solution to Problem

According to the present invention, there is provided a construction management device for excavation machinery configured to generate information on a result of construction by the excavation machinery having a work machine, a swing body to which the work machine is attached, and a traveling body traveling with the swing body mounted thereon, the device comprising: a vehicle state detection part that detects information on current position and posture of the excavation machinery; a work machine position information generation part that determines work machine position information as information on a position of the work machine, based on a result of a detection by the vehicle state detection part; a traveling body position information generation part that determines traveling body position information as information on a position of the traveling body, based on the result of the detection by the vehicle state detection part; and a construction position information generation part that uses one of the work machine position information and the traveling body position information to generate construction position information as information on a position of construction by the excavation machinery, wherein when the excavation machinery travels, the construction position information generation part uses not the work machine position information, but the traveling body position information, to generate the construction position information.

In the present invention, it is preferable that when the traveling body is stopped, the construction position information generation part uses the work machine position information to generate the construction position information.

In the present invention, it is preferable that the construction management device for excavation machinery, further comprises: an operation part that controls an operation of the traveling body and an operation detection part that detects an operation of the operation part, wherein when the operation detection part detects an operation for traveling the traveling body, the construction position information generation part uses the traveling body position information to generate the construction position information, and when the operation detection part detects an operation for stopping the traveling body, the construction position information generation part uses the work machine position information to generate the construction position information.

In the present invention, it is preferable that the operation part includes a pilot-pressure operation lever or pedal.

In the present invention, it is preferable that in a case of using the work machine position information, when current work machine position information generated by the work machine position information generation part becomes smaller than the position of the construction position information which already exists in a height direction, the construction position information generation part updates the construction position information to the current work machine position information.

In the present invention, it is preferable that in a case of using the traveling body position information, the construction position information generation part updates the construction position information to current traveling position information generated by the traveling body position information generation part.

In the present invention, it is preferable that the work machine position information refers to information on a position of a blade edge of a bucket attached to the work machine.

In the present invention, it is preferable that the traveling body position information generation part generates the traveling body position information, based on a movement direction in which the excavation machinery travels.

In the present invention, it is preferable that the construction position information generation part displays the construction position information on a display device included in the excavation machinery.

According to the present invention, there is provided a construction management device for excavator, configured to generate information on a result of construction by the excavator having a work machine, a swing body to which the work machine is attached, and a traveling body traveling with the swing body mounted thereon, the device comprising: a vehicle state detection part that detects information on current position and posture of the excavator; a work machine position information generation part that determines work machine position information as information on a position of the work machine, based on a result of a detection by the vehicle state detection part; a traveling body position information generation part that determines traveling body position information as information on a position of the traveling body, based on the result of the detection by the vehicle state detection part; a pilot-pressure traveling lever that controls an operation of the traveling body; and an operation detection part that detects an input to the traveling lever, wherein when the operation detection part detects an input for traveling the traveling body, the construction position generation information part uses the traveling body position information to generate the construction position information, and when the operation detection part detects an input for stopping the traveling body, the construction position generation information part uses the work machine position information to generate the construction position information.

According to the present invention, there is provided excavation machinery, comprising: a work machine; a swing body to which the work machine is attached; a traveling body that travels with the swing body mounted thereon; and the construction management device for excavation machinery.

According to the present invention, there is provided a construction management system, comprising: a construction plan creation part that creates a construction plan for the excavation machinery; a construction plan transmission par that transmits the construction plan to the construction management device in the excavation machinery; and a construction position information acquisition part that acquires the construction position information generated by the construction management device in the excavation machinery.

The present invention makes it possible to achieve accurate a construction result in computerized construction using excavation machinery with a work machine.

BRIEF DESCRIPTION OF DRAWINGS

FIG. 20 is a diagram of a construction management system 200 according to the embodiment.

DESCRIPTION OF EMBODIMENTS

An embodiment for carrying out the present invention (embodiment) will be described in detail with reference to the drawings. The present invention is not limited by the contents of the embodiment described below. In the following embodiment, an excavator is used as an example of excavation machinery. However, excavation machinery covered by the following embodiment is not limited to excavators as far as the excavation machinery has the function to perform excavation or backfill works.

<Overall Configuration of Excavation Machinery>

Figure 1:
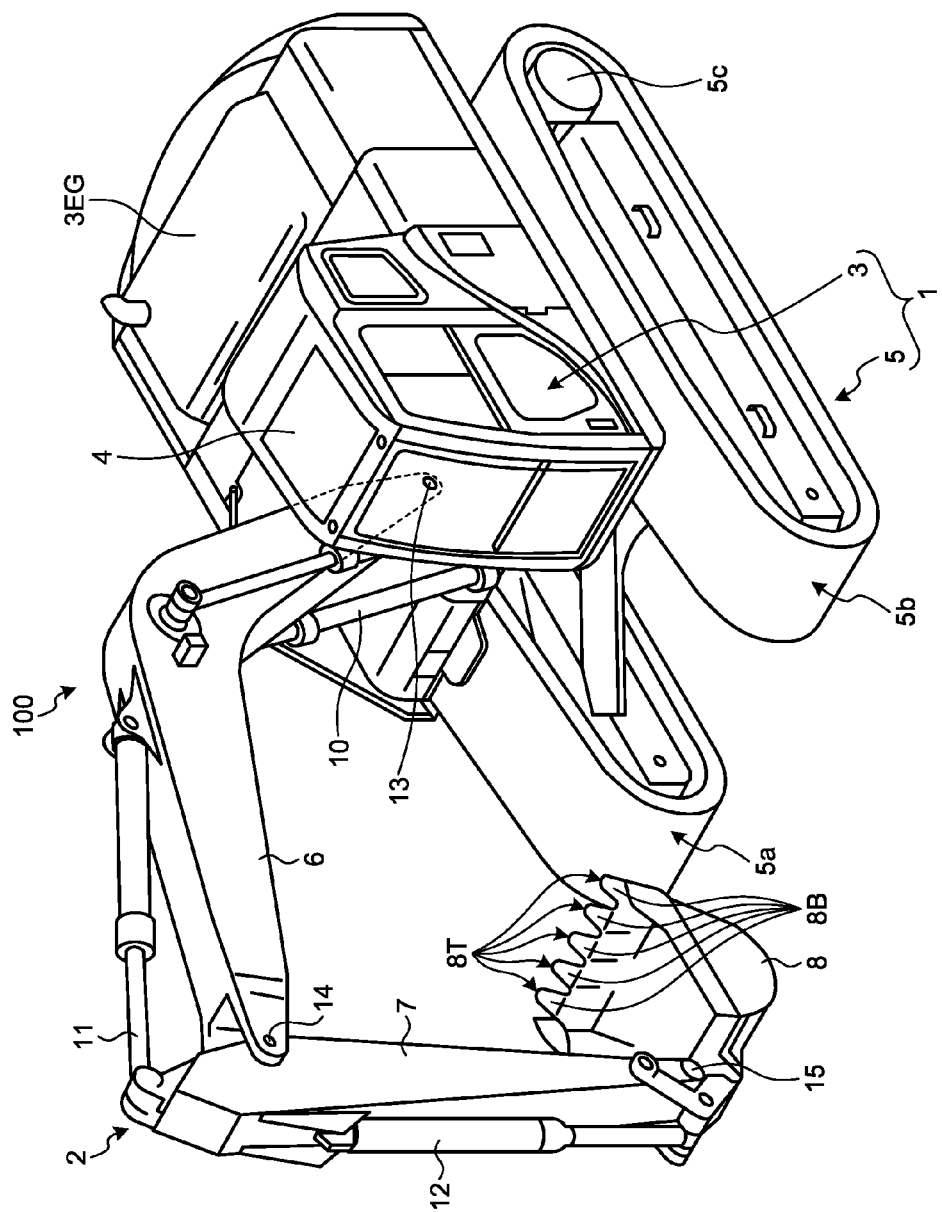
FIG. 1 is a perspective view of an excavator 100 according to an embodiment of the present invention.
Figure 2:
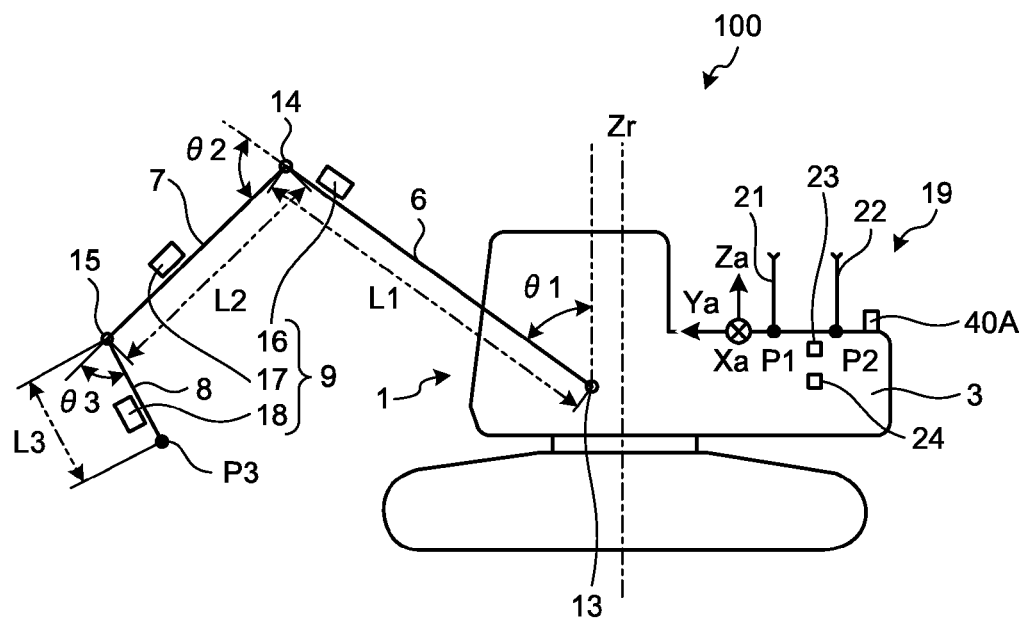
FIG. 2 is a side view of the excavator 100.
Figure 3:
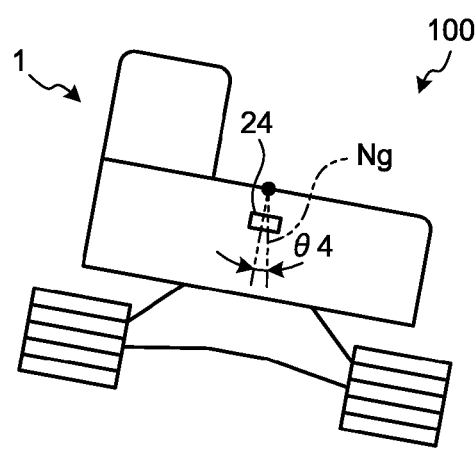
FIG. 3 is a rear view of the excavator 100.
Figure 4:
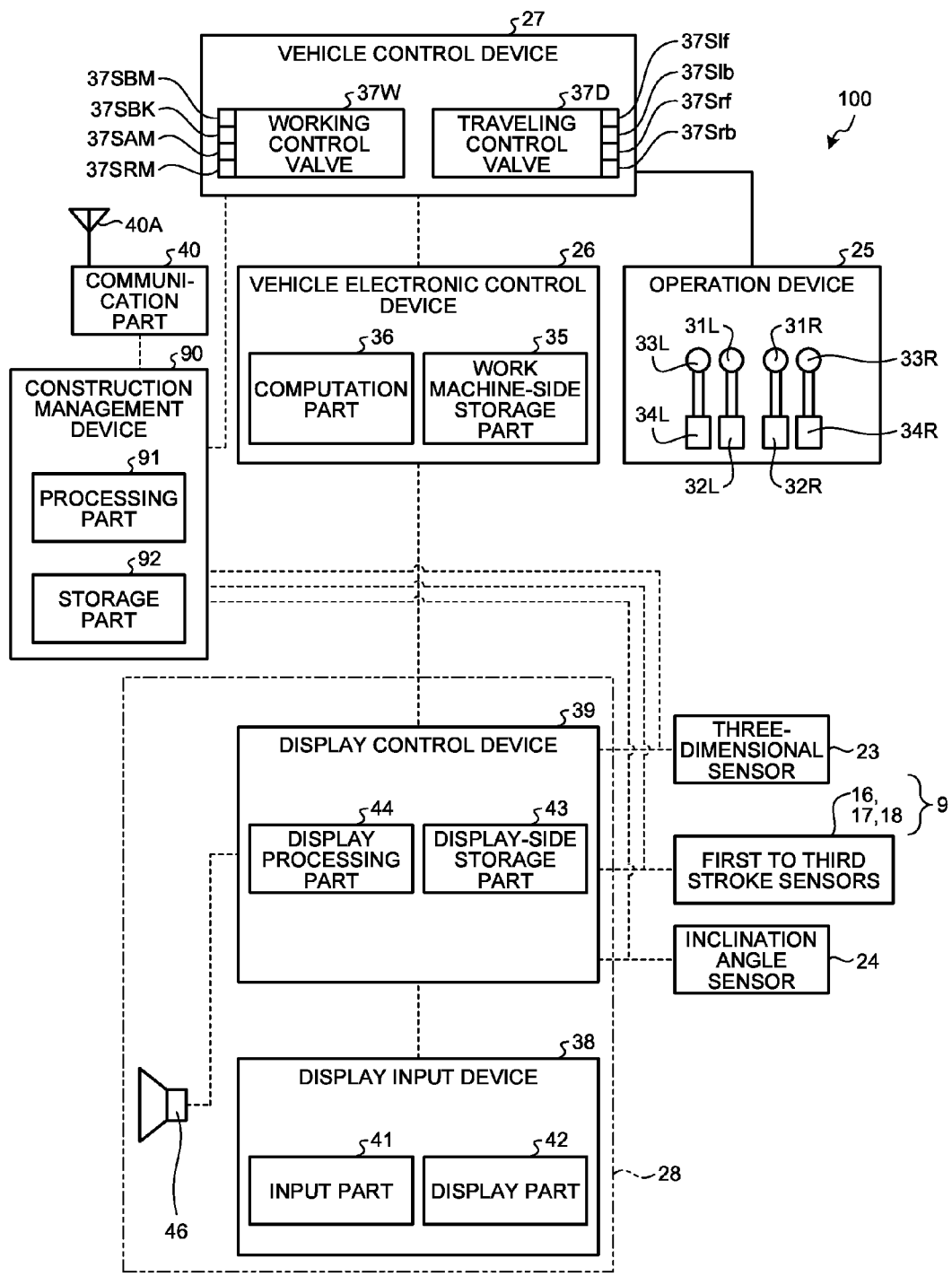
FIG. 4 is a block diagram of a control system included in the excavator 100.
Figure 5:
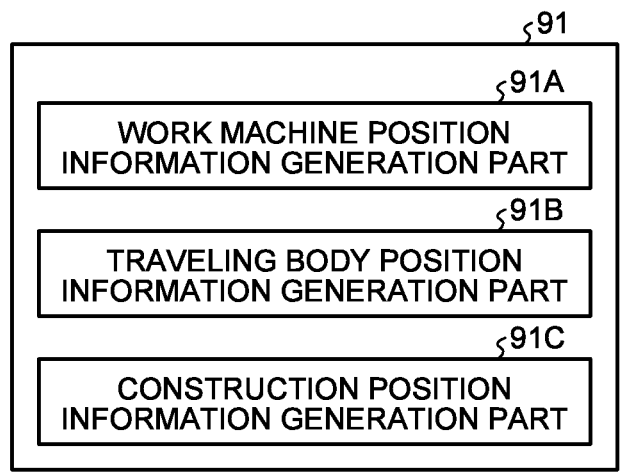
FIG. 5 is a block diagram of a processing part 91 included in a construction management device 90 for excavation machinery.
Figure 6:
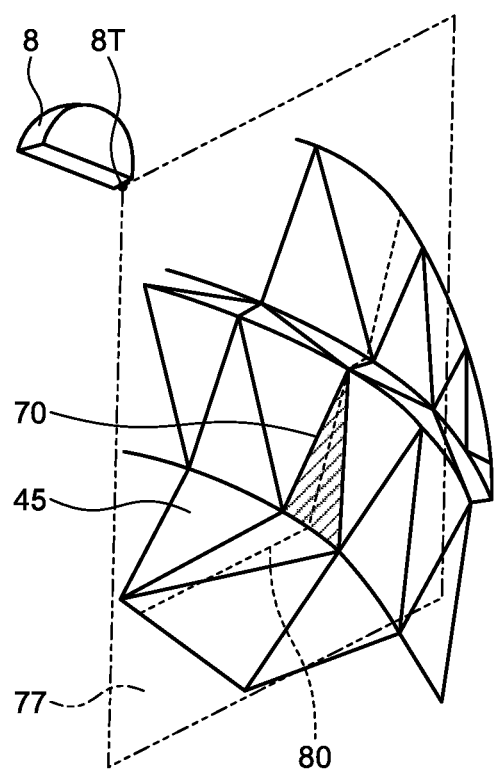
FIG. 6 is a diagram of a designed landform indicated by designed landform data.

FIG. 1 is a perspective view of an excavator 100 according to the embodiment. FIG. 2 is a side view of the excavator 100. FIG. 3 is a rear view of the excavator 100. FIG. 4 is a block diagram of a control system included in the excavator 100. FIG. 5 is a block diagram of a processing part 91 included in a construction management device 90 for excavation machinery. FIG. 6 is a diagram of a designed landform indicated by designed landform data. In the embodiment, the excavator 100 as excavation machinery has a vehicle main body 1 as a main body part and a work machine 2. The vehicle main body 1 includes an upper swing body 3 and a traveling device 5 as a traveling body. The upper swing body 3 contains devices such as a power generator and a hydraulic pump not illustrated in an engine room 3EG. The engine room 3EG is located at one end side of the upper swing body 3.

In the embodiment, the excavator 100 has an internal combustion engine such as a diesel engine as a power generator, for example. However, the excavator 100 is not limited to this. The excavator 100 may include a so-called hybrid power generator in which an internal combustion engine, a generator motor, and an electric storage device are combined together, for example.

The upper swing body 3 has an operating room 4. The operating room 4 is provided at the other end side of the upper swing body 3. That is, the operating room 4 is positioned on the side opposite to the side at which the engine room 3EG is positioned. The operating room 4 has therein a display input device 38 and an operating device 25 as illustrated in FIG. 4. These components are described later. A traveling device 5 is provided with the upper swing body 3. The traveling device 5 has crawler tracks 5a and 5b. When one or both of right and left hydraulic motors 5c are driven to rotate the crawler tracks 5a and 5b, the traveling device 5 travels the excavator 100. The work machine 2 is attached to a side of the operating room 4 of the upper swing body 3.

The excavator 100 may include tires instead of the crawler tracks 5a and 5b and include a traveling device that can travel by transferring a driving force of a diesel engine not illustrated to the tires via a transmission. For example, the excavator 100 in such a form may be a wheel excavator. Alternatively, the excavator 100 may be a backhoe loader that includes a traveling device with tires as described above, has an work machine mounted on the vehicle main body (main body part), and does not include the upper swing body 3 as illustrated in FIG. 1 or a swing mechanism for the upper swing body 3, for example. That is, the backhoe loader has a work machine mounted on the vehicle main body and a traveling device constituting a part of the vehicle main body.

The upper swing body 3 has the work machine 2 and the operating room 4 positioned on the front side, and has the engine room 3EG positioned on the back side. The left side of the upper swing body 3 is on the observer's left, and the right side of the upper swing body 3 is on the observer's right. The excavator 100 or the vehicle main body 1 has the traveling device 5 on the lower side with respect to the upper swing body 3, and has the upper swing body 3 on the upper side with respect to the traveling device 5. When the excavator 100 is placed on a horizontal plane, the downward direction is along the vertical direction, that is, the direction of action of gravity, and the upward direction is along the side opposite to the vertical direction.

The work machine 2 has a boom 6, an arm 7, a bucket 8, a boom cylinder 10, an arm cylinder 11, and a bucket cylinder 12. The base end part of the boom 6 is swingably attached to the front part of the vehicle main body 1 via a boom pin 13. The base end part of the arm 7 is swingably attached to the leading end part of the boom 6 via an arm pin 14. The bucket 8 is attached to the leading end part of the arm 7 via a bucket pin 15. The bucket 8 swings around the bucket pin 15.

As illustrated in FIG. 2, the length of the boom 6, that is, the distance from the boom pin 13 to the arm pin 14 is L1. The length of the arm 7, that is, the distance from the center of the arm pin 14 to the center of the bucket pin 15 is L2. The length of the bucket 8, that is, the distance from the center of the bucket pin 15 to blade edges 8T of the bucket 8 is L3. As illustrated in FIG. 1, the blade edges 8T are the leading ends of blades 8B attached to the bucket 8 on the opposite side of the bucket pin 15. The bucket 8 has a plurality of blades 8B. The plurality of blades 8B is arranged in a line. A line of a plurality of blade edges 8T will be referred as appropriate to as a blade edge line.

The bucket 8 may not have the plurality of blades 8B. Specifically, the bucket 8 may not have the blades 8B illustrated in FIG. 1, but may have a straight blade edge formed by a steel plate. The work machine 2 may include a tilt bucket with a single blade, for example. The tilt bucket includes a bucket tilt cylinder, and can be tilted to the right and left sides to allow an excavator to freely prepare and level inclined planes and flat lands even if the excavator is located in slope lands, and can perform surface compaction by a bottom plate. Alternatively, the work machine 2 may include a slope bucket or a rock drilling attachment with a rock drilling chip, instead of the bucket 8.

The boom cylinder 10, the arm cylinder 11, and the bucket cylinder 12 illustrated in FIG. 1 are hydraulic cylinders driven by an operating oil pressure (hereinafter, referred as appropriate to as oil pressure). The boom cylinder 10 drives the boom 6 to move up and down. The arm cylinder 11 drives the arm 7 to rotate around the arm pin 14. The bucket cylinder 12 drives the bucket 8 to rotate around the bucket pin 15. Arranged between the hydraulic cylinders such as the boom cylinder 10, the arm cylinder 11, and the bucket cylinder 12 and a hydraulic pump not illustrated are a traveling control valve 37D and an working control valve 37W illustrated in FIG. 4. When a vehicle electronic control device 26 described later controls the traveling control valve 37D and the working control valve 37W to regulate the flow amount of operating oil supplied to the boom cylinder 10, the arm cylinder 11, the bucket cylinder 12, or the hydraulic motor 5c. As a result, operations of the boom cylinder 10, the arm cylinder 11, and the bucket cylinder 12 are controlled.

As illustrated in FIG. 2, the boom 6, the arm 7, and the bucket 8 are provided with a first stroke sensor 16, a second stroke sensor 17, and a third stroke sensor 18, respectively. The first stroke sensor 16, the second stroke sensor 17, and the third stroke sensor 18 constitute a posture detection part 9 that detects the posture of the work machine 2. The first stroke sensor 16 detects the stroke length of the boom cylinder 10. A display control device 39 described later (refer to FIG. 4) calculates inclination angle θ1 of the boom 6 with respect to axis Za in a vehicle main body coordinate system described later, from the stroke length of the boom cylinder 10 detected by the first stroke sensor 16. The second stroke sensor 17 detects the stroke length of the arm cylinder 11. The display control device 39 calculates inclination angle θ2 of the arm 7 with respect to the boom 6, from the stroke length of the arm cylinder 11 detected by the second stroke sensor 17. The third stroke sensor 18 detects the stroke length of the bucket cylinder 12. The display control device 39 calculates inclination angle θ3 of the bucket 8 with respect to the arm 7, from the stroke length of the bucket cylinder 12 detected by the third stroke sensor 18.

The vehicle main body 1 includes a position detection part 19 as illustrated in FIG. 2. The position detection part 19 detects the current position of the excavator 100. The position detection part 19 has two antennas 21 and 22 for RTK-GNSS (Real Time Kinematic—Global Navigation Satellite Systems) (hereinafter, referred as appropriate to as GNSS antennas 21 and 22), a three-dimensional position sensor 23, and an inclination angle sensor 24. The GNSS antennas 21 and 22 are placed on the vehicle main body 1, more specifically, on the upper swing body 3. In the embodiment, the GNSS antennas 21 and 22 are separated from each other by a specific distance along Ya axis in a vehicle main body coordinate system {Xa, Ya, Za} as a three-dimensional coordinate system. The origin point of the vehicle main body coordinate system {Xa, Ya, Za} is arbitrarily determined according to designed dimensions of the vehicle main body 1. Information on the coordinates of the origin point of the vehicle main body coordinate system {Xa, Ya, Za} is stored in advance in a work machine-side storage part 35.

The GNSS antennas 21 and 22 are preferably installed on the upper swing body 3 at both end positions separated from each other in the horizontal direction of the excavator 100. Alternatively, the GNSS antennas 21 and 22 placed on the upper swing body 3 behind a counter weight not illustrated (back end of the upper swing body 3) or the operating room 4. In either case, when being separated from each other as much as possible, the GNSS antennas 21 and 22 are enhanced in accuracy of detection of the current position of the excavator 100. The GNSS antennas 21 and 22 are also preferably positioned so as not to hinder the vision of an operator as much as possible. The posture detection part 9 and the position detection part 19 as a vehicle state detection part obtain the position (current position) of the excavator 100 as excavation machinery and the vehicle state as information on the posture of the work machine 2.

Signals received by the GNSS antennas 21 and 22 according to GNSS radio waves are input into the three-dimensional position sensor 23. The three-dimensional position sensor 23 detects installation positions P1 and P2 of the GNSS antennas 21 and 22. As illustrated in FIG. 3, the inclination angle sensor 24 detects inclination angle θ4 of the vehicle main body 1 in the width direction with respect to the direction of action of gravity, that is, vertical direction Ng (hereinafter, referred as appropriate to as roll angle θ4). In the embodiment, the width direction refers to the width direction of the bucket 8, which is aligned with the width direction of the upper swing body 3, that is, the horizontal direction. However, if the work machine 2 includes a tilt bucket, the width direction of the bucket and the width direction of the upper swing body 3 may not be aligned with each other.

The upper swing body 3 swings around a predetermined axis Zr. The predetermined axis Zr will be referred as appropriate to as swing center axis Zr. The swing center axis Zr is parallel to the axis Za in the vehicle main body coordinate system. In addition to the GNSS antennas 21 and 22, the upper swing body 3 includes an antenna 40A. The antenna 40A is used for wireless communications between the excavator 100 and the outside.

Referring to FIG. 4, a control system in the excavator 100 will be described. The excavator 100 includes an operating device 25, a vehicle electronic control device 26, a vehicle control device 27, a display system for excavation machinery (hereinafter, referred as appropriate to as display system) 28, a communication part 40, and a construction management device for excavation machinery (hereinafter, referred as appropriate to as construction management device) 90. The operating device 25 has work machine operation members 31L and 31R and traveling operation members 33L and 33R as operating parts, work machine operation detection parts 32L and 32R, and traveling operation detection parts 34L and 34R. In the embodiment, the work machine operation members 31L and 31R and the traveling operation members 33L and 33R are pilot-pressure levers but are not limited to these levers. The work machine operation members 31L and 31R and the traveling operation members 33L and 33R may be electric levers, for example. In this case, the work machine operation detection parts 32L and 32R and the traveling operation detection parts 34L and 34R function as operation detection parts to detect inputs into the work machine operation members 31L and 31R and the traveling operation members 33L and 33R as operation parts.

The work machine operation members 31L and 31R are members for an operator to operate the work machine 2 and are operation levers including grips and bars such as joysticks, for example. The thus structured work machine operation members 31L and 31R can be inclined from front to back and from side to side by grasping the grip. As illustrated in FIG. 4, there are two pairs of the work machine operation members 31L and 31R and the work machine operation detection parts 32L and 32R. The work machine operation members 31L and 31R are placed on right and left sides of an operator's seat not illustrated in the operating room 4. For example, the arm 7 and the upper swing body 3 can be moved by operating the work machine operation member 31L placed on the left side, and the bucket 8 and the boom 6 can be moved by operating the work machine operation member 31R on the right side.

The work machine operation detection parts 32L and 32R generate pilot pressures according to inputs into the work machine operation members 31L and 31R, that is, operations performed on the work machine operation members 31L and 31R, and apply the generated pilot pressures of the operating oil to the working control valve 37W included in the vehicle control device 27. The working control valve 37W operates according to the magnitudes of the pilot pressures to supply the operating oil from a hydraulic pump not illustrated to the boom cylinder 10, the arm cylinder 11, the bucket cylinder 12, and the like illustrated in FIG. 1. If the work machine operation members 31L and 31R are electric levers, the work machine operation detection parts 32L and 32R detect inputs to the work machine operation members 31L and 31R, that is, operations performed on the work machine operation members 31L and 31R, by the use of a potentiometer or the like, for example, and convert the inputs to electric signals (detection signals) and send the same to the vehicle electronic control device 26. The vehicle electronic control device 26 controls the working control valve 37W according to the detection signals.

The traveling operation members 33L and 33R are members for an operator to operate traveling of the excavator 100. The traveling operation members 33L and 33R are operation levers including grips and bars (hereinafter, referred as appropriate to as traveling levers), for example. The traveling operation members 33L and 33R can be inclined back and forth by the operator grasping the grips. The excavator 100 can be moved forward by simultaneously inclining forward the traveling operation members 33L and 33R as two operation levers, and the excavator 100 can be moved backward by simultaneously inclining backward the two operation levers. Alternatively, the traveling operation members 33L and 33R are seesaw-type pedals not illustrated and capable of being operated by the operator stepping on. The pedals are stepped on at the front or back side to generate pilot pressures as in the case of the operation levers as described above, and the traveling control valve 37D is controlled to drive the hydraulic motor 5c and move the excavator 100 forward or backward. The excavator 100 can be moved forward by simultaneously stepping on the two pedals at the front sides, and the excavator 100 can be moved backward by simultaneously stepping on the two pedals at the back sides. Alternatively, by stepping on one pedal at the front or back side, one of the crawler tracks 5a and 5b can be rotated to swing the excavator 100. As described in the foregoing, when traveling the excavator 100, the operator can incline the operation levers manually back and forth or step on the pedals at the front or back side to drive the hydraulic motor 5c of the traveling device 5. As illustrated in FIG. 4, there are two pairs of traveling operation members 33L and 33R and traveling operation detection parts 34L and 34R. The traveling operation members 33L and 33R are horizontally arranged in front of the operator's seat not illustrated in the operating room 4. By operating the traveling operation member 33L on the left side, the left hydraulic motor 5c can be driven to operate the left crawler track 5b. By operating the traveling operation member 33R on the right side, the right hydraulic motor 5c can be driven to operate the right crawler track 5a.

The traveling operation detection parts 34L and 34R generate pilot pressures according to inputs into the traveling operation members 33L and 33R, that is, operations performed on the traveling operation members 33L and 33R, and apply the generated pilot pressures to the traveling control valve 37D included in the vehicle control device 27. The traveling control valve 37D operates according to the magnitudes of the pilot pressures to supply the operating oil to the traveling hydraulic motor 5c. If the traveling operation members 33L and 33R are electric levers, the traveling operation detection parts 34L and 34R detect inputs to the traveling operation members 33L and 33R, that is, operations performed on the traveling operation members 33L and 33R, by the use of a potentiometer or the like, for example, and convert the inputs to electric signals (detection signals) and send the same to the vehicle electronic control device 26. The vehicle electronic control device 26 controls the traveling control valve 37D according to the detection signals.

The vehicle electronic control device 26 has the work machine-side storage part 35 including at least one of a RAM (random access memory) and a ROM (read only memory) and a computation part 36 such as a CPU (central processing unit). The vehicle electronic control device 26 controls the engine and the hydraulic pump included in the excavator 100. The work machine-side storage part 35 stores computer programs and the like for controlling the engine and the hydraulic pump. In addition, the work machine-side storage part 35 stores information on the coordinates of the origin point of the vehicle main body coordinate system COM as described above. Further, the work machine-side storage part 35 stores information on the coordinates of a swing central position P4 (refer to FIGS. 7 and 8) in the vehicle main body coordinate system COM. The details of the swing central point P4 will be described later. If the work machine operation members 31L and 31R and the traveling operation members 33L and 33R are electric levers, the vehicle electronic control device 26 also controls operations of the work machine 2, the upper swing body 3, and the traveling device 5. In this case, the vehicle electronic control device 26 generates control signals for operating the work machine 2 or the traveling device 5 according to operations performed on the work machine operation members 31L and 31R or the traveling operation members 33L and 33R, and outputs the same to the vehicle control device 27.

The vehicle control device 27 is a hydraulic device including a hydraulic control valve and the like, and has the traveling control valve 37D and the working control valve 37W. These components are controlled by pilot pressures from the work machine operation detection parts 32L and 32R and the traveling operation detection parts 34L and 34R. If the work machine operation members 31L and 31R and the traveling operation members 33L and 33R are electric levers, the traveling control valve 37D and the working control valve 37W are controlled according to control signals from the vehicle electronic control device 26.

If the traveling operation members 33L and 33R are pilot-pressure traveling lever, when the operator of the excavator 100 gives inputs to the levers to operate the levers, a flow amount of operating oil according to the pilot pressure from the traveling operation detection parts 34L and 34R flows out of the traveling control valve 37D and is supplied to the traveling hydraulic motor 5c. When one or both of the traveling operation members 33L and 33R are operated, one or both of the right and left hydraulic motors 5c illustrated in FIG. 1 are driven. As a result, at least one of the crawler tracks 5a and 5b rotates and the excavator 100 travels.

The vehicle control device 27 includes hydraulic sensors 37Slf, 37Slb, 37Srf, and 37Srb that detect the magnitudes of pilot pressures supplied to the traveling control valve 37D and generate electric signals. The hydraulic sensor 37Slf detects a pilot pressure for forward travel on the left side, the hydraulic sensor 37Slb detects a pilot pressure for backward travel on the left side, the hydraulic sensor 37Srf detects a pilot pressure for forward travel on the right side, and the hydraulic sensor 37Srb detects a pilot pressure for backward travel on the right side. The vehicle electronic control device 26 acquires electric signals indicative of the magnitudes of the pilot pressures of the operating oil detected and generated by the hydraulic sensors 37Slf, 37Slb, 37Srf, and 37Srb. The electric signals are used for control of the engine or the hydraulic pump or for operations of a construction management device described later. As described above, in the embodiment, the work machine operation members 31L and 31R and the traveling operation members 33L and 33R are pilot-pressure levers. In this case, the hydraulic sensors 37Slf, 37Slb, 37Srf, and 37Srb and hydraulic sensors 37SBM, 37SBK, 37SAM, and 37SBM described later function as operation detection parts that detect inputs given to the work machine operation members 31L and 31R and the traveling operation members 33L and 33R as operation parts.

If the work machine operation members 31L and 31R are pilot-pressure operation levers, when the operator of the excavator 100 operates these operation levers, a flow amount of operating oil corresponding to the pilot pressures generated according to operations performed on the work machine operation members 31L and 31R flows out of the working control valve 37W. The operating oil flowing out of the working control valve 37W is supplied to at least one of the boom cylinder 10, the arm cylinder 11, the bucket cylinder 12, and the swing motor. Then, at least one of the boom cylinder 10, the arm cylinder 11, the bucket cylinder 12, and the swing motor illustrated in FIG. 1 is elongated and contracted in the case of cylinder(s) or driven and swung in the case of the swing motor, according to the operating oil supplied from the working control valve 37W. As a result, at least one of the work machine 2 and the upper swing body 3 operates.

The vehicle control device 27 includes the hydraulic sensors 37SBM, 37SBK, 37SAM, and 37SRM that detect the magnitudes of the pilot pressures supplied to the working control valve 37W and generate electric signals. The hydraulic sensor 37SBM detects a pilot pressure corresponding to the boom cylinder 10, the hydraulic sensor 37SBK detects a pilot pressure corresponding to the arm cylinder 11, and the hydraulic sensor 37SAM detects a pilot pressure corresponding to the bucket cylinder 12, and the hydraulic sensor 37SRM detects a pilot pressure corresponding to the swing motor. The vehicle electronic control device 26 acquires the electric signals indicative of the magnitudes of the pilot pressures detected and generated by the hydraulic sensors 37SBM, 37SBK, 37SAM, and 37SRM. The electric signals are used for control of the engine or the hydraulic pump or operations of a construction management device described later, or the like.

<Construction Management Device 90>

A construction management device 90 has a processing part 91 such as a CPU (central processing unit) and a storage part 92 including at least one of a RAM (random access memory) and a ROM (read only memory). The construction management device 90, more specifically, the processing part 91 generates construction position information of the excavator 100. The construction position information refers to information including results of construction by the excavator 100 on a construction target. The construction target refers to a site of construction by the excavator 100 where soil is excavated, ditches are dug, slopes are shaped on the ground, or the like. The construction position information refers to information on position of surface of a construction target after construction, for example. The information on the position is represented by a position (coordinates) in a global coordinate system, for example. The construction position information also refers to a changed construction target, for example, the shape of a landform.

As illustrated in FIG. 5, the processing part 91 has a work machine position information generation part 91A, a traveling body position information generation part 91B, and a construction position information generation part 91C. These parts have their respective functions as described below. Each of the functions is realized by reading a computer program realizing the function from the storage part 92 and processing a sequence of instructions described in the read computer program, for example. The storage part 92 stores the foregoing computer programs, construction position information generated by the processing part 91, designed landform data prepared in advance, and the like. The designed landform data refers to information on the shape and position of a three-dimensional designed landform. The designed landform refers to a target shape indicating the landform of the ground of the construction target. In other words, the designed landform indicates a target form as a target plane (hereinafter, referred as appropriate to as designed plane).

The construction management device 90 is connected to a three-dimensional position sensor 23, a first stroke sensor 16, a second stroke sensor 17, and a third stroke sensor 18 as posture detection parts 9, and an inclination angle sensor 24. The construction management device 90 also can receive electric signals generated by the hydraulic sensors 37Slf, 37Slb, 37Srf, and 37Srb and the hydraulic sensors 37SBM, 37SBK, 37SAM, and 37SRM. The construction management device 90 acquires detection values from the sensors. The construction management device 90 is connected to the communication part 40 including the antenna 40A described above. The construction management device 90 exchanges information by wireless communications with the outside of the excavator 100, for example, the construction management system managing the construction by the excavator 100, via the communication part 40. The wireless communications may be terrestrial communications or satellite communications. By the wireless communications, the excavator 100 and the construction management system can exchange information such as the designed landform data and the construction position information.

The work machine position information generation part 91A determines work machine position information as information on the position of the work machine 2, according to results of detection by the vehicle state detection part described above. The traveling body position information generation part 91B determines traveling body position information as information on the position of the traveling device 5, according to results of detection by the vehicle state detection part described above. The construction position information generation part 91C uses either the work machine position information or the traveling body position information to generate construction position information as information on the position of a construction target constructed by the excavator 100. The construction position information refers to results of construction by the excavator 100.

While the excavator 100 travels, the construction position information generation part 91C generates the construction position information using the traveling body position information, not using the work machine position information. While the excavator 100 travels, at least one of the hydraulic sensors 37Slf, 37Slb, 37Srf, and 37Srb as operation detection parts detects that the operation levers (the traveling operation members 33L and 33R) are operated by the operator to travel the traveling device 5. In this case, the construction position information generation part 91C generates the construction position information using the traveling body position information. When the hydraulic sensors 37Slf, 37Slb, 37Srf, and 37Srb as operation detection parts detect that the traveling device 5 is stopped, the construction position information generation part 91C generates the construction position information using the work machine position information.

<Display System 28>

The display system 28 provides the operator with information indicating landform shape in a working area including information of a designed plane as a construction target or information on the posture or position of the work machine 2. When operating the work machine 2 and the traveling device 5 to excavate the ground in the construction target and construct the designed plane described later, the operator can use the information provided on the display system 28 to carry out efficient construction work. That is, the display system 28 can support operations of the work machine 2 by the operator. The display system 28 has the boom cylinder 10, the arm cylinder 11, the bucket cylinder 12, the three-dimensional position sensor 23, the inclination angle sensor 24, the first stroke sensor 16, the second stroke sensor 17, and the third stroke sensor 18 described above, and also has a display input device 38 as a display device, a display control device 39, and a sound generation device 46 including a speaker for issuing warning sound.

The display input device 38 has a touch panel-type input part 41 and a display part 42 such as a LCD (liquid crystal display). The display input device 38 displays a guide screen to provide information for performing construction work such as excavation. The guide screen includes various keys. The operator (serviceperson in the case of inspection or repair of the excavator 100) touches various keys on the guide screen to execute various functions of the display system 28.

The display control device 39 executes various functions of the display system 28. The display control device 39 is an electronic control device having a display-side storage part 43 including at least one of a RAM and ROM and a display processing part 44 such as a CPU. The display-side storage part 43 stores work machine data. The work machine data includes the length L1 of the boom 6, the length L2 of the arm 7, and the L3 of the bucket 8 described above. The work machine data also includes the inclination angle θ1 of the boom 6, the inclination angle θ2 of the arm 7, and the inclination angle θ3 of the bucket 8.

The display control device 39 and the vehicle electronic control device 26 can communicate with each other via a wireless or wired communication means. The wired communication means includes an in-vehicle LAN (local area network), for example. The display control device 39 displays a guide screen on the display part 42 of the display input device 38, according to the foregoing designed landform data and the foregoing information such as detection values from the various sensors. In this case, the display control device 39 reads the designed landform data from the storage part 92 of the construction management device 90 and uses the same for display on the guide screen. The designed landform has a plurality of designed planes 45 expressed by triangular polygons as illustrated in FIG. 6, for example. In FIG. 6, reference sign 45 is given to only one of the plurality of designed planes and is omitted for the other designed planes. The construction target is one or more of these designed planes 45. The operator selects one or more of the designed planes 45 as target plane(s) 70. The target plane 70 is a plane to be excavated out of the plurality of designed planes 45. The display control device 39 displays on the display input device 38 a guide screen to inform the operator of the position of the target plane 70. Besides, the display control device 39 can display on the display part 42 of the display input device 38 the construction position information generated by the construction position information generation part 91C of the construction management device 90. The details of display of the construction position information on the display part 42 will be described later.

<Method for Determining the Position of the Blade Edges 8T of the Bucket 8>

In the embodiment, the construction position information generated by the construction position information generation part 91C of the construction management device 90 may include position information on the ground or the like of a construction target excavated by the bucket 8. The position information refers to work machine position information. The construction target is excavated by the blade edges 8T of the bucket 8. Thus, to generate the work machine position information, the construction position information generation part 91C needs to determine at least the position of the blade edges 8T during excavation (hereinafter, referred as appropriate to as blade edge position P3). The blade edge position P3 is represented by coordinates in the global coordinate system {X, Y, Z}, for example. In the construction management device 90, a work machine position information generation part 91A illustrated in FIG. 5 determines the blade edge position P3. The work machine position information generation part 91A determines the blade edge position P3 of the bucket 8 in the global coordinate system {X, Y, Z}, according to detection values from the three-dimensional position sensor 23, the first stroke sensor 16, the second stroke sensor 17, the third stroke sensor 18, the inclination angle sensor 24, and the like. In the embodiment, the blade edge position P3 of the bucket 8 is determined in such a manner as described below.

Figure 7:
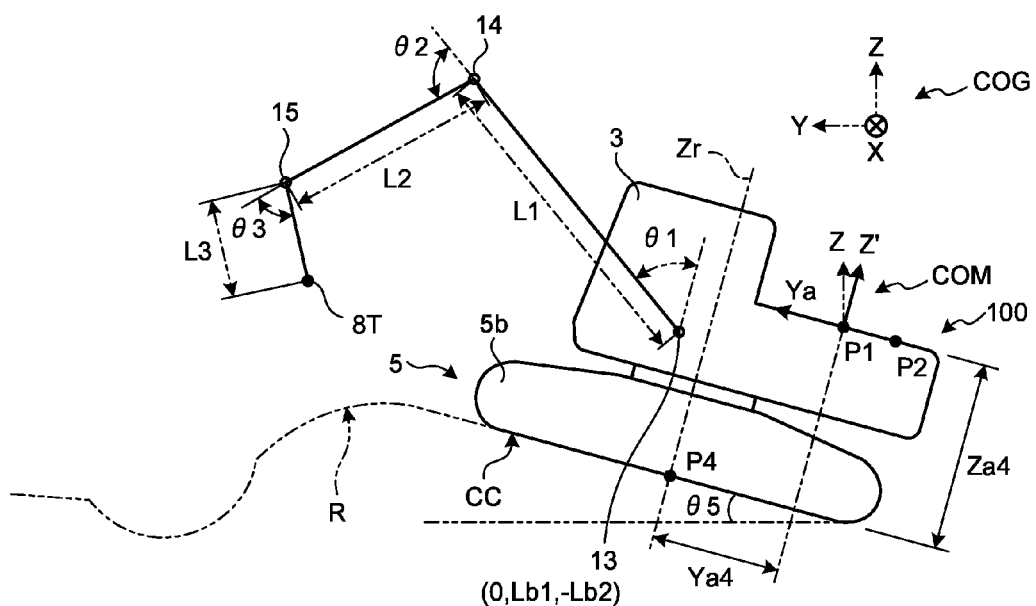
FIG. 7 is a diagram for describing one example of a method for determining a blade edge position P3 of a bucket 8.
Figure 8:
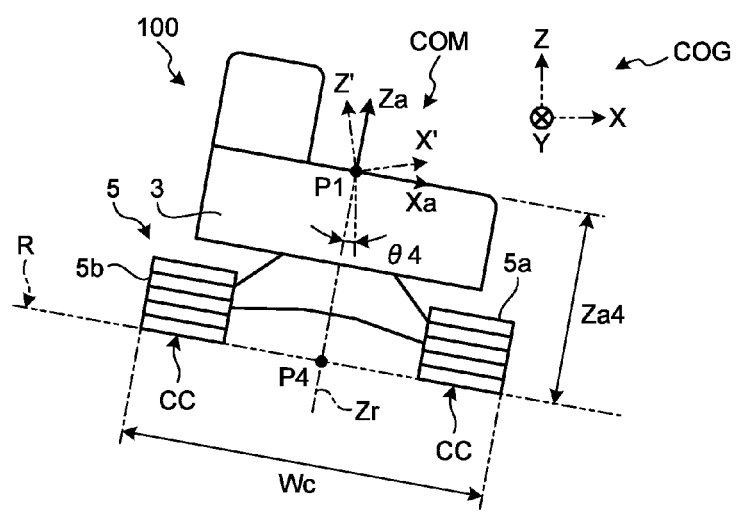
FIG. 8 is a diagram for describing one example of a method for determining the blade edge position P3 of the bucket 8.

FIGS. 7 and 8 are diagrams of one example of a method for determining the blade edge position P3 of the bucket 8. FIG. 7 is a side view of the excavator 100, and FIG. 8 is a rear view of the excavator 100. To determine the blade edge position P3 of the bucket 8, the work machine position information generation part 91A of the construction management device 90 determines the vehicle main body coordinate system {Xa, Ya, Za} with an origin point at the installation position P1 of the GNSS antenna 21 described above, as illustrated in FIGS. 7 and 8. In this example, the longitudinal side of the excavator 100, that is, the Ya axis of the coordinate system (vehicle main body coordinate system) COM of the vehicle main body 1 inclines with respect to the Y axis of the global coordinate system COG. The coordinates of the boom pin 13 in the vehicle main body coordinate system COM are (0, Lbi, −Lb2), which are stored in advance in the storage part 92 of the construction management device 90.

The three-dimensional position sensor 23 illustrated in FIGS. 2 and 4 detects the installation positions P1 and P2 of the GNSS antennas 21 and 22. From the coordinates of the detected installation positions P1 and P2, a unit vector along the Ya axis is calculated by Equation (1) as follows:

$$Ya=(P1-P2)/|P1-P2| \quad (1)$$

As illustrated in FIG. 7, by introducing vector Z' passing through a plane represented by two vectors Ya and Z and made perpendicular to Ya, relationships in Equations (2) and (3) hold. In Equation (3), c denotes a constant. From Equations (2) and (3), Z' is expressed by Equation (4) as shown below. In addition, by introducing a vector X' perpendicular to Ya and Z', X' is expressed by Equation (5) as shown below.

$$(Z',Ya)=0 \quad (2)$$

$$Z'=(1-c) \times Z+c \times Ya \quad (3)$$

$$Z'=Z+\{(Z,Ya)/((Z,Ya)-1)\} \times (Ya-Z) \quad (4)$$

$$X'=Ya \perp Z' \quad (5)$$

As illustrated in FIG. 8, the vehicle main body coordinate system COM is rotated by roll angle θ4 around the Ya axis and thus is expressed by Equation (6) as shown below.

$$[Xa\ Ya\ Za] = [X'\ Ya\ Z'] \begin{bmatrix} \cos\theta 4 & 0 & \sin\theta 4 \\ 0 & 1 & 0 \\ -\sin\theta 4 & 0 & \cos\theta 4 \end{bmatrix} \quad (6)$$

The current inclination angles θ1, θ2, and θ3 of the boom 6, the arm 7, and the bucket 8 described above are calculated from the detection values from the first stroke sensor 16, the second stroke sensor 17, and the third stroke sensor 18. The coordinates (xat, yat, zat) of the blade edges 8T of the bucket 8 in the vehicle main body coordinate system COM can be determined by Equations (7), (8), and (9) using the inclination angles θ1, θ2, and θ3 and the lengths L1, L2, and L3 of the boom 6, the arm 7, and the bucket 8. The blade edges 8T of the bucket 8 move in the plane Ya-Za of the vehicle main body coordinate system COM. The coordinates of the blade edges 8T of the bucket 8 in the global coordinate system COG can be determined by Equation (10). The coordinates of the blade edges 8T in the global coordinate system COG refer to the blade edge position P3. The blade edge position P3 is represented by the coordinates {X, Y, Z} in the global coordinate system COG. The work machine position information generation part 91A stores the thus calculated blade edge position P3 in the storage part 92 of the construction management device 90.

$$Xat=0 \quad (7)$$

$$yat=Lb1+L1\times\sin\theta1+L2\times\sin(\theta1+\theta2)+L3\times\sin(\theta1+\theta2+\theta3) \quad (8)$$

$$zat=-Lb2+L1\times\cos\theta1+L2\times\cos(\theta1+\theta2)+L3\times\cos(\theta1+\theta2+\theta3) \quad (9)$$

$$P3=xat\cdot Xa+yat\cdot Ya+zat\cdot Za+P1 \quad (10)$$

<How to Determine a Swing Center of the Upper Swing Body 3 on a Ground Contact Plane of the Excavator 100>

In the embodiment, the construction position information generated by the construction position information generation part 91C of the construction management device 90 may include position information on a ground contact plane of the excavator 100, that is, a plane of contact between the crawler tracks 5a and 5b included in the traveling device 5 and a contact subject such as ground R. This information position refers to traveling body position information. The traveling body position information includes information on the position of a swing center (hereinafter, referred as appropriate to as swing center position) P4 of the upper swing body 3 on a ground contact plane CC of the traveling device 5, for example, which is represented by coordinates {X, Y, Z} in the global coordinate system COG. The ground contact plane CC is a plane defined by the crawler tracks 5a and 5b included in the traveling device 5. The swing center position P4 on the ground contact plane CC is placed at a point of intersection of the ground contact plane CC and the swing central axis Zr.

When the construction position information generation part 91C generates the construction position information, the traveling body position information generation part 91B illustrated in FIG. 5 determines the swing center position P4. Specifically, the traveling body position information generation part 91B computes and determines the coordinates of the swing center position P4 in the global coordinate system COG, based on the coordinates of the swing center position P4 in the vehicle main body coordinate system COM. Thus, the traveling body position information generation part 91B obtains the coordinates of the swing center position P4 in the global coordinate system COG. The coordinates of the swing center position P4 in the global coordinate system COG varies according to traveling of the traveling device 5. Accordingly, during traveling of the traveling device 5, the traveling body position information generation part 91B determines the coordinates of the swing center position P4 at predetermined intervals to generate the traveling body position information. The swing center position P4 can be determined by using a geometric positional relationship with the installation position P1 of the GNSS antenna 21.

It is assumed that, in the global coordinate system COG, the inclination angle of the traveling device 5 around the X axis is designated as θ5 and the roll angle of the traveling device 5 around the Y axis as θ4. It is also assumed that the distance between the installation position P1 and the swing center position P4 along the direction orthogonal to the ground contact plane CC is designated as Za4 and the distance between the installation position P1 and the swing center position P4 in the Ya axis direction of the vehicle main body coordinate system COM as Ya4. Information indicative of the distance between Za4 and Ya4 is stored in advance in the work machine-side storage part 35. If it is assumed that the coordinates of the installation position P1 in the global coordinate system COG is designated as {Xp1, Yp1, Zp1}, the swing center position P4 in the global coordinate system COG can be determined as {Xp1−Za4×sin θ4, Yp1+Ya4×cos θ5, Zp1}, for example. As described above, the coordinates of the swing center position P4 in the global coordinate system COG may be determined by using the coordinates of the swing center position P4 in the vehicle main body coordinate system COM.

The traveling body position information generation part 91B detects the installation position P1 of the GNSS antenna 21 from the three-dimensional position sensor 23 illustrated in FIGS. 2 and 4. The traveling body position information generation part 91B determines the swing center position P4 in the global coordinate system COG by using the foregoing relationship from the detected coordinates {Xp1, Yp1, Zp1} of the installation position P1, and stores the same in the storage part 92, for example. The processing part 91 of the construction management device 90 illustrated in FIG. 4 generates the construction position information of the excavator 100, using either the work machine position information based on the blade edge position P3 determined by the work machine position information generation part 91A or the travelling body position information based on the swing center position P4 determined by the traveling body position information generation part 91B.

<Display of Locus of the Blade Edge 8T of the Bucket 8>

The display control device 39 may display the locus of the blade edges 8T during excavation on the display part 42 of the display input device 38. The display control device 39 may determine the blade edge position P3 or may display the locus of the blade edges 8T during excavation on the display part 42 by using the blade edge position P3 determined by the work machine position information generation part 91A. In addition, the work machine position information generation part 91A may generate the work machine position information by using the blade edge position P3 determined by the display control device 39.

The display control device 39 calculates an intersection line 80 of the three-dimensional designed landform and a plane passing through the blade edges 8T of the bucket 8 (hereinafter, referred as appropriate to as Ya−Za plane 77) as illustrated in FIG. 6, based on the blade edge position P3 of the bucket 8 determined by the foregoing method and the designed landform data stored in the storage part 92 of the construction management device 90 illustrated in FIG. 4 in the embodiment. Then, the display control device 39 displays a part of the intersection line 80 passing through the target plane 70 as a target line on the guide screen. Next, descriptions will be given as to the case where the display control device 39 illustrated in FIG. 4 displays the locus of the blade edges 8T during excavation of the ground as a working target by the bucket 8 on a screen 42P of the display part 42 of the display input device 38.

Figure 9:
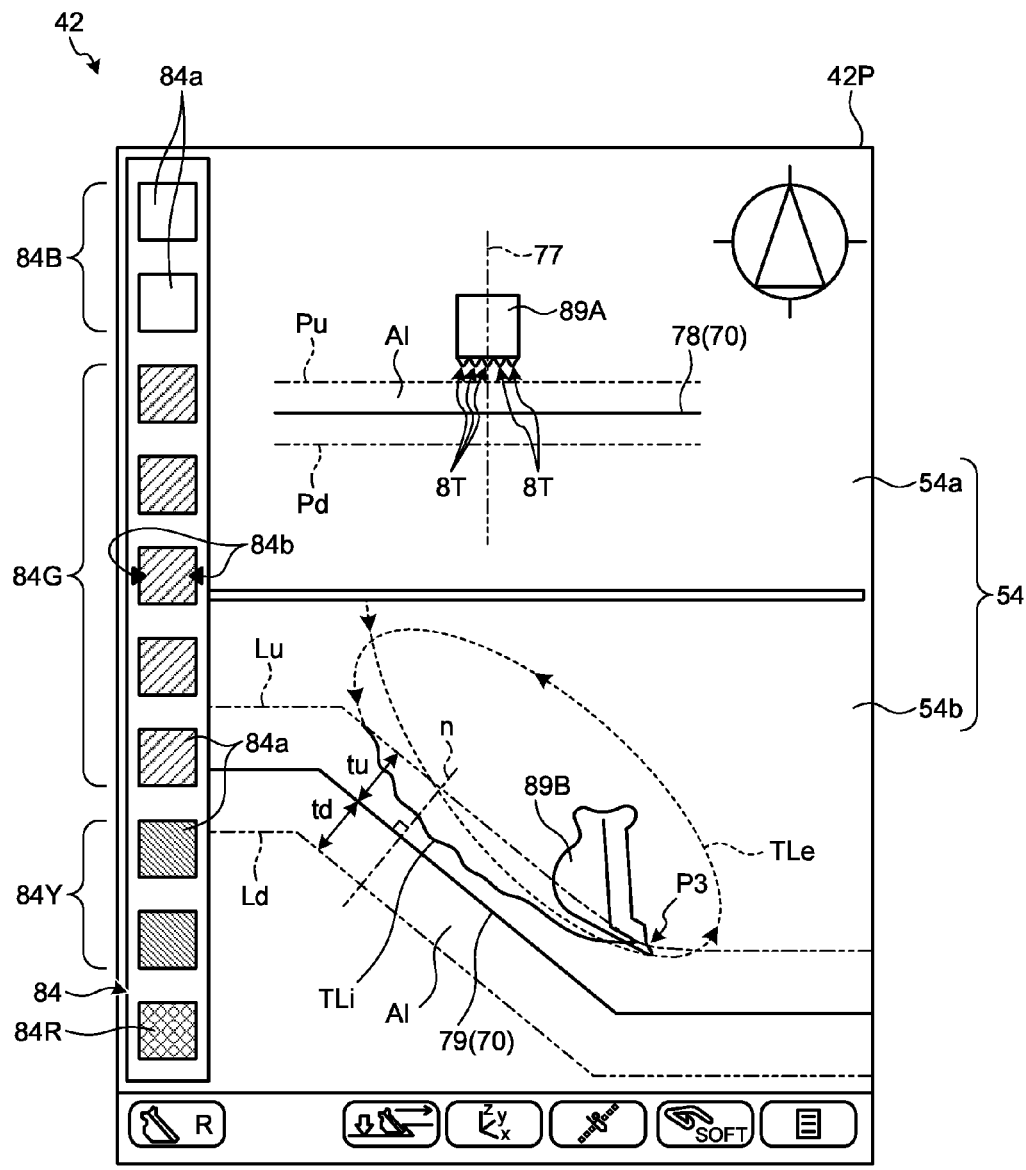
FIG. 9 is a diagram of an example of a locus TLi of blade edges 8T of the bucket 8 displayed on a screen 42P of a display part 42.

FIG. 9 is a diagram of a display example of a locus TLi of the blade edges 8T of the bucket 8 on the screen 42P of the display part 42. In the embodiment, the display control device 39, more specifically, the display processing part 44 determines the position of the blade edges 8T of the bucket 8, based on information on the current position of the excavator 100. When at least a part of the bucket 8 enters a predetermined range AI around the target plane 70 in the direction orthogonal to the target plane 70, the display processing part 44 displays the locus TLi of the blade edges 8T (hereinafter, referred as appropriate to as blade edge locus) existing in the predetermined range AI determined based on the position of the blade edges 8T, as information on construction results, on the screen 42P of the display part 42.

Accordingly, the operator of the excavator 100 can check the state of actual excavation by the bucket 8 from the blade edge locus TLi on the screen 42P of the display part 42. As a result, the operator can perform construction work while confirming the current construction status by visually checking the blade edge locus TLi, thereby resulting in improvement of working efficiency. When the blade edges 8T are out of the predetermined range AI, the locus is not displayed. That is, no unnecessary information on places not in the vicinity of the designed plane 45 (or the target plane 70) is displayed on the screen 42P. Thus, while the operator of the excavator 100 proceeds with construction work according to the designed plane, the display system 28 can provide the operator with information on construction results in an easy-to-understand manner.

As illustrated in FIG. 9, the blade edge locus TLi is displayed on a side view part 54b of an excavation screen 54. That is, the blade edge locus TLi refers to the locus of the blade edges 8T of the bucket 8 in a side view. An icon 90 for the bucket 8 in a side view is displayed on the side view part 54b. In addition, displayed on the side view part 54b are a target line 79 indicative of a cross section of the target plane 70 in a side view and a ground surface-side line Lu and an underground-side line Ld for defining the predetermined range AI in the direction orthogonal to the target plane 70 (two-dot chain lines in FIG. 9). The ground surface-side line Lu and the underground-side line Ld are parallel to the target line 79. Displayed on a front view part 54a are an icon 89 for the bucket 8 in a front view, a target line 78 indicative of a cross section of the target plane 70 in a front view, and a first plane Pu and a second plane Pd described later.

The predetermined range AI is surrounded by the first plane Pu parallel to the target plane 70 existing at a predetermined distance tu from the target plane 70 to the ground surface, and the second plane Pd parallel to the target plane 70 existing at a predetermined distance td from the target plane 70 to the underground, in the direction orthogonal to the target plane 70 (the direction in which a dotted line n extends in FIG. 9). A line of intersection of the first plane Pu and the Ya–Za plane 77 passing through the blade edges 8T of the bucket 8 (refer to FIG. 6) refers to the ground surface-side line Lu, and a line of intersection line 80 of the second plane Pd and the Ya–Za plane 77 refers to the underground-side line Ld.

In FIG. 9, the blade edge locus TLi is represented by a slid line in the predetermined range AI. In FIG. 9, a broken line outside the predetermined range AI (outside the ground surface-side line Lu in this example) also constitutes a locus TLe of the blade edges 8T of the bucket 8 (hereinafter, referred as appropriate to as out-of-range locus). In this example, the out-of-range locus TLe is drawn for sake of convenience, but is not displayed on the actual screen 42P of the display part 42).

The predetermined distances tu and td defining the predetermined range AI may be the same or different in length. If the predetermined distances tu and td are different in length, the predetermined distance td is preferably shorter than the predetermined distance tu for accuracy of construction. In the embodiment, the predetermined distances tu and td are the same in length, that is, tu=td. In the embodiment, the extent of the predetermined range AI, that is, the lengths of the predetermined distances tu and td are equivalent to tolerances for construction on the target plane 70 by the excavator 100. Accordingly, it is possible to reduce the possibility of excessively excavating the designed plane 45 (target plane 70) and suppress decrease in accuracy of construction. The lengths of the predetermined distances tu and td may be changed. For example, the display processing part 44 of the display control device 39 may display a menu for changing the predetermined distances tu and td on the display part 42 of the display input device 38 illustrated in FIG. 4, so that the operator of the excavator 100 can input changed values from the input part 41. Accordingly, even if the predetermined range AI needs to be changed due to a design change or a situation at an actual construction site, it is possible to meet the need in a flexible manner, thereby resulting in improvement of working efficiency.

In the embodiment, the predetermined range AI corresponds to a plurality of index bars 84a indicated with reference sign 84G included in graphic information 84. Level mark 84b indicates the position corresponding to the target plane 70. Specifically, the extent of the predetermined range AI in the direction orthogonal to the target plane 70 equivalent to the magnitude of tu+td corresponds to the plurality of index bars 84a indicated with reference sign 84G. In the embodiment, when the blade edges 8T of the bucket 8 move within the range, the target plane 70 is constructed within a range of designed tolerance.

Of the plurality of index bars 84a included in the graphic information 84, the index bars 84a indicated with reference sign 84B represent the outside of the predetermined range AI on the ground surface side. Of the plurality of index bars 84a included in the graphic information 84, the index bars 84a indicated with reference sign 84Y represent the outside of the predetermined range AI on the underground side. These bars indicate that the target plane 70 is excavated beyond the range of designed tolerance for the target plane 70. Of the plurality of index bars 84a included in the graphic information 84, the index bar 84a indicated with reference sign 84R represents the outside of the predetermined range AI on the most underground side. This bar indicates that the target plane 70 is excavated largely beyond the range of designed tolerance for the target plane 70.

The plurality of index bars 84a included in the graphic information 84 represent a positional relationship between the blade edges 8T of the bucket 8 and the target plane 70 during exaction by the excavator 100. Specifically, the display mode of the index bars 84a varies depending on the distance between the blade edges 8T and the target plane 70. For example, the index bars 84a with reference sign 84B are displayed in blue, the index bars 84a with reference sign 84G are displayed in green, the index bars 84a with reference sign 84Y are displayed in yellow, and the index bar 84a with reference sign 84R is displayed in red.

Therefore, if the blade edges 8T of the bucket 8 are located on the outside of the predetermined range AI on the ground surface side, the index bars 84a with reference sign 84B are displayed in blue. If the blade edges 8T of the bucket 8 are located within the predetermined range AI, the index bars 84a with reference sign 84B are displayed in blue and the index bars 84a with reference sign 84G are displayed in green. If the blade edges 8T of the bucket 8 are located on the outside of the predetermined range AI on the underground side, the index bars 84a with reference sign 84B are displayed in blue, and the index bars 84a with reference sign 84G are displayed in green, and the index bars 84a with reference sign 84Y are displayed in yellow. As in the foregoing, in addition to the display mode of the blade edge locus TLi since the display mode of the index bars 84*a* varies depending on the distance between the blade edges 8T of the bucket 8 and the target plane 70, the operator of the excavator 100 can know more easily whether the blade edges 8T of the bucket 8 excavate beyond the predetermined range AI centered on the target plane 70. As a result, the operator can easily hold the blade edges 8T of the bucket 8 within the predetermined range AI during excavation, thereby resulting in improvement of construction efficiency.

When the blade edges 8T of the bucket 8 enter the predetermined range AI, the blade edge locus TLi is displayed within the predetermined range AI. Accordingly, the display control device 39 presents on the screen 42P of the display part 42 the blade edge locus TLi on which the blade edges 8T of the bucket 8 are deemed as actually excavating the predetermined range AI, and thus the operator of the excavator 100 can confirm the construction status within the sufficient range. The present invention is not limited to this, but the blade edge locus TLi may be displayed within the predetermined range AI when a part of the bucket 8, for example, the rear surface of the bucket 8 enters the predetermined range AI. In the embodiment, the blade edge locus TLi only needs to be displayed when at least a part of the bucket 8 enters the predetermined range AI.

The blade edge locus TLi is not displayed outside the predetermined range AI. Accordingly, after completion of an excavation work of the target plane 70, for example, in the case of a plane with a slope to be worked (target plane 70), after completion of an excavation work by which the slope is excavated from top down by the bucket 8 by a predetermined depth, when the blade edges 8T of the bucket 8 come out of the predetermined range AI, the out-of-range locus TLe outside the predetermined range AI is not displayed. After the blade edges 8T of the bucket 8 come out of the predetermined range AI, the blade edge locus TLi displayed in the predetermined range AI continues to be displayed until the blade edges 8T enter again the predetermined range AI. Accordingly, the operator of the excavator 100 can check on the screen 42P of the display part 42 the records of excavation on the ground of the construction target by the blade edges 8T of the bucket 8. In addition, since the display control device 39 does not display the out-of-range locus TLe on the outside of the predetermined range AI, the operator can surely recognize information in the vicinity of the target plane 70 required for the construction work. Further, since the display control device 39 does not display the out-of-range locus TLe on the outside of the predetermined range AI, it is not necessary to save the data on the out-of-range locus TLe in the display-side storage part 43. Accordingly, it is possible to use the storage capacity of the display-side storage part 43 in an efficient and effective manner.

In the foregoing example, the out-of-range locus TLe is not displayed, but the embodiment is not limited to this. For instance, the display control device 39 may display the blade edge locus TLi and the out-of-range locus TLe in different display modes on the screen 42P of the display part 42. As an example, the display control device 39 may display the blade edge locus TLi by a red solid line and display the out-of-range locus TLe in a less visible color than the color of the blade edge locus TLi (for instance, light blue in this example) and by a broken line thinner than the solid line indicating the blade edge locus TLi. Accordingly, the display control device 39 allows the operator of the excavator 100 to recognize the blade edge locus TLi existing within the predetermined range AI. In addition, the operator can visually check the out-of-range locus TLe, and thus when moving the bucket 8 to the ground surface of the working target, for example, the operator can use the out-of-range locus TLe to improve the method for operating the work machine operation members 31L and 31R, enhance the working efficiency, and the like.

When the blade edge locus TLi and the out-of-range locus TLe are displayed in different display modes on the screen 42P of the display part 42, the out-of-range locus TLe existing outside the predetermined range AI is less visible than the blade edge locus TLi existing within the predetermined range AI. Accordingly, even when the out-of-range locus TLe is displayed on the screen 42P, the operator of the excavator 100 can recognize the blade edge locus TLi almost without being interrupted by the out-of-range locus TLe. As a result, the display system 28 can provide the operator of the excavator 100 with information on construction results in an easy-to-understand manner while the operator proceeds with construction work according to the designed plane.

As described above, in the embodiment, the blade edge locus TLi in the predetermined range AI and the out-of-range locus TLe out of the predetermined range AI need to be displayed in different display modes. The two loci can be differentiated in display mode in such a manner that the two are displayed in different display modes or only the blade edge locus TLi is displayed whereas the out-of-range locus TLe is not displayed.

In the embodiment, the display control device 39 may issue a warning sound according to the distance between the blade edges 8T of the bucket 8 and the designed plane 45 not set as target plane 70. For example, when the blade edges 8T come out of the predetermined range AI on the underground side of the construction target, that is, when the blade edges 8T move toward the underground side beyond the underground-side line Ld, the display control device 39 may issue a warning sound from the sound generation device 46 illustrated in FIG. 4. If the blade edges 8T of the bucket 8 excavate the ground beyond the target plane 70 or the designed plane 45, it is necessary to conduct an additional work such as backfilling, and thus the designed plane 45 (target plane 70) cannot be efficiently constructed. Therefore, the display control device 39 issues a warning sound according to the distance between the blade edges 8T and the designed plane 45. By changing the mode of issuing a warning sound according to the distance between the blade edges 8T and the target plane 70 or the designed plane 45, it is possible to allow the operator of the excavator 100 to recognize that the target plane 70 or the designed plane 45 is excessively excavated. Therefore, the operator can adjust an amount of excavation and suppress excessive excavation to the minimum.

<Construction Position Information>

Since the construction position information is equivalent to the results of construction by the excavator 100, it is possible to grasp the construction status at that point of time by accumulating the latest construction position information generated by the construction management device 90 illustrated in FIG. 4. The manager managing the construction plan for the construction target can know from the construction status the situation of the progress and whether the construction is correctly realized and the like. As described above, the construction position information is either the traveling body position information or the work machine position information.

Figure 10:
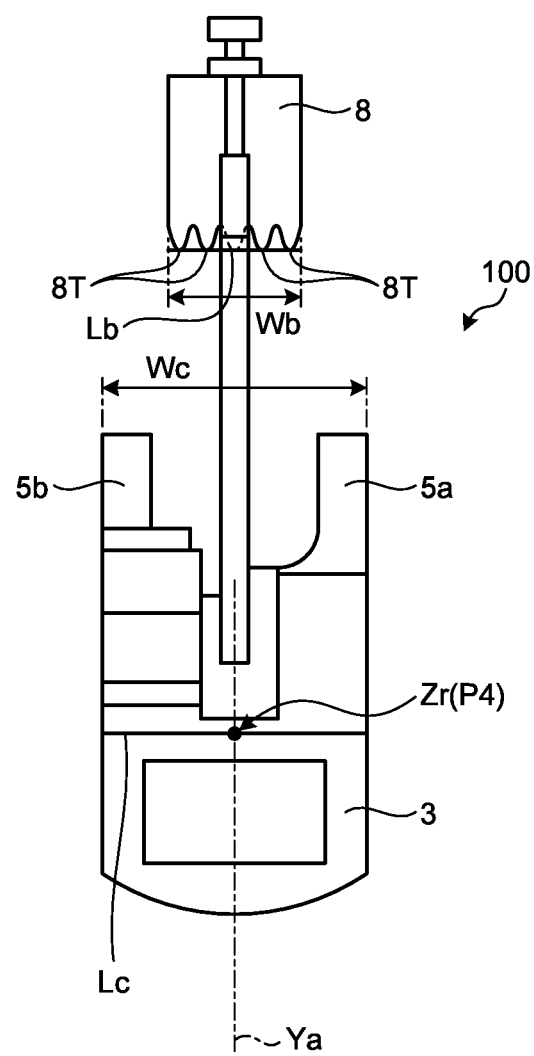
FIG. 10 is a diagram for describing construction position information.
Figure 13:
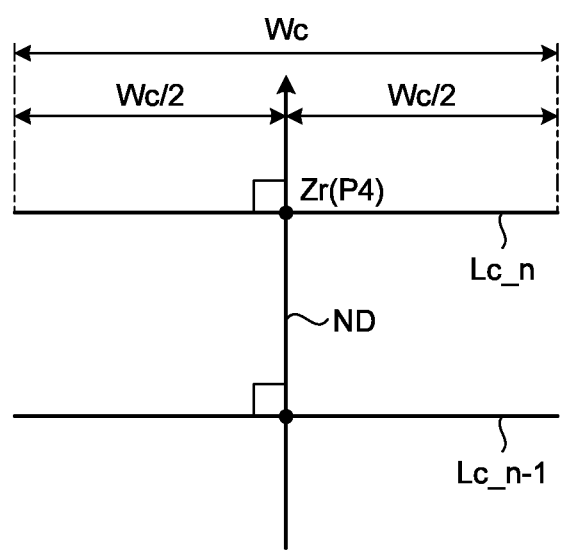
FIG. 13 is a diagram for describing traveling body position information.
Figure 14:
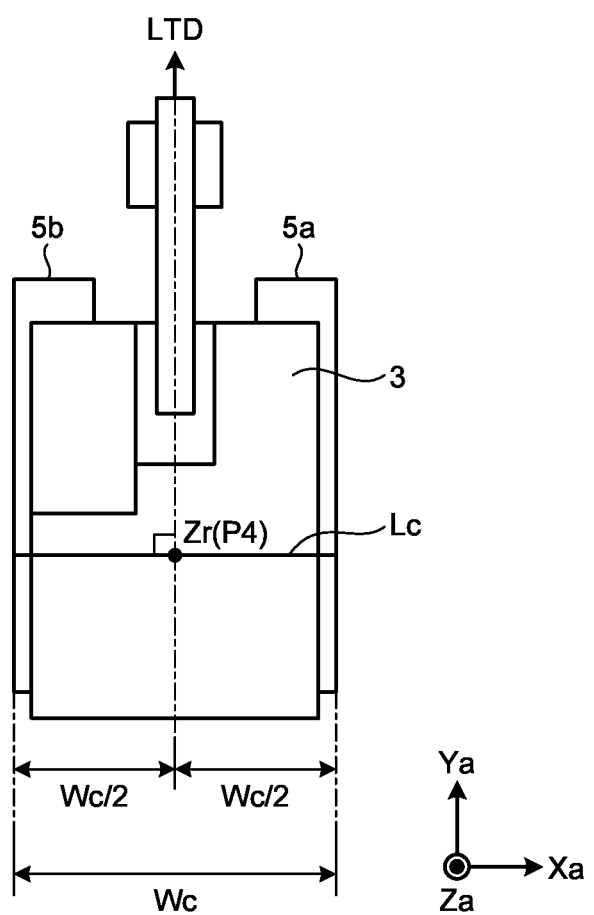
FIG. 14 is a diagram for describing traveling body position information.
Figure 15:
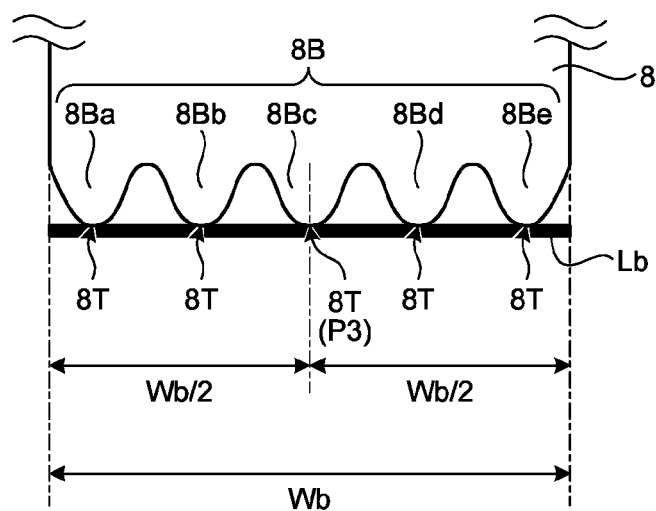
FIG. 15 is a diagram for describing work machine position information.

FIG. 10 is a diagram for describing the construction position information. FIGS. 11 to 14 are diagrams for describing the traveling body position information. FIG. 15 is a diagram for describing the work machine position information. In the embodiment, the traveling body position information refers to coordinates of a traveling body-side current state update line Lc in the global coordinate system COG. The traveling body-side current state update line Lc is a straight line that passes through the foregoing swing center position P4, is parallel to the Xa-Ya plane in the vehicle main body coordinate system COM, and is orthogonal to the direction of travel of the excavator 100. The length of the traveling body-side current state update line Lc refers to a distance Wc between the outsides of the pair of crawler tracks 5a and 5b (hereinafter, referred as appropriate to as inter-crawler track distance). The inter-crawler-track distance Wc is stored in advance in the storage part 92.

The work machine position information refers to coordinates of a work machine-side current state update line Lb in the global coordinate system COG. The work machine-side current state update line Lb is a straight line that connects together the blade edges 8T of the bucket 8. The length of the work machine-side current state update line Lb refers to a width Wb of the bucket 8 (hereinafter, referred as appropriate as to bucket width). The bucket width Wb refers to the maximum dimension of the bucket 8 parallel to the axial direction of the bucket pin 15 illustrated in FIG. 1. The bucket width Wb is stored in advance in the storage part 92. For example, if the bucket 8 is a tilt bucket or a slope bucket and has a straight-shaped blade edge formed by a steel plate, a straight line along the blade constitutes the work machine-side current state update line Lb. If the work machine 2 illustrated in FIG. 1 is equipped with a rock drill or the like instead of the bucket 8, the position information on the leading edge of a drill bit, more specifically, the coordinates of the leading edge of the drill bit in the global coordinate system COG constitute the work machine position information.

Figure 11:
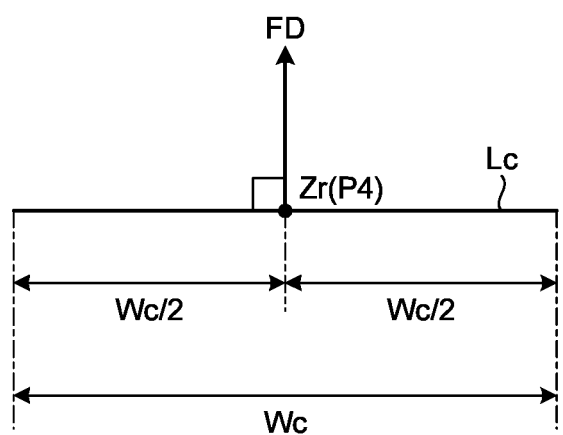
FIG. 11 is a diagram for describing traveling body position information.

The travelling body position information to be generated by the traveling body position information generation part 91B illustrated in FIG. 5 is generated by a first, second, or third method depending on the amount of movement of the excavator 100 per unit time or whether the traveling body-side current state update line Lc is already generated. As illustrated in FIG. 11, according to the first method, the direction of the traveling body-side current state update line Lc, specifically, the direction of extension of the traveling body-side current state update line Lc is orthogonal to movement direction FD of the excavator 100 determined based on the position information of the excavator 100 detected by the position detection part 19 illustrated in FIG. 2. Since the first method cannot be used unless the movement direction FD of the excavator 100 is known, the first method is applied to the case where movement amount Mv of the excavator 100 per unit time is larger than a predetermined threshold value Mvc. The predetermined threshold value Mvc is determined according to the accuracy of RTK-GNSS used at the position detection part 19, and is set to 1 m/second, for example.

Figure 12:
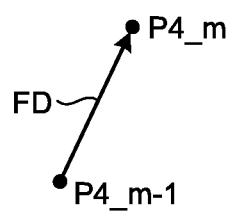
FIG. 12 is a diagram for describing traveling body position information.

When Mv>Mvc, the traveling body position information generation part 91B generates a straight line that moves in a direction orthogonal to the movement direction FD, passes through the swing center position P4, and is parallel to the Xa-Ya plane in the vehicle main body coordinate system COM, as the traveling body-side current state update line Lc, as illustrated in FIG. 11. The traveling body-side current state update line Lc passes through the swing center axis Zr at a position of Wc/2 (midpoint of the traveling body-side current state update line Lc) from the left outside of the crawler track 5a or the right outside of the crawler track 5b. The position information on the traveling body-side current state update line Lc, that is, the coordinates in the global coordinate system COG constitutes the traveling body position information. To determine the movement direction FD, as illustrated in FIG. 12, the traveling body position information generation part 91B determines, from a plurality of (two in this example) swing center positions P4_$m$−1 and P4_$m$ acquired at different timings, a vector from the swing center position P4_$m$−1 to the swing center position P4_$m$ (m denotes a natural number). The traveling body position information generation part 91B sets the direction of the vector as the movement direction FD.

In the excavator 100, the upper swing body 3 swings and thus, when the traveling body position information is determined with respect to the position of the work machine 2 or the bucket 8, some error may occur. Under the condition that the movement direction FD can be obtained, the traveling body position information generation part 91B can accurately determine the traveling body position information by determining the traveling body position information according to the movement direction FD. Next, the second method for determining the traveling body position information will be described.

The second method is applied when Mv≤Mvc and the traveling body-side current state update line Lc is already generated. In this case, as illustrated in FIG. 13, the traveling body position information generation part 91B generates as a new traveling body-side current state update line Lc_n a straight line that moves in a direction orthogonal to a line ND orthogonal to the traveling body-side current state update line Lc_n−1 generated at the previous processing period, passes through the swing center position P4, and is parallel to the Xa-Ya plane in the vehicle main body coordinate system COM (n denotes a natural number). The traveling body-side current state update line Lc_n passes through the swing center axis Zr at a position of Wc/2 from the left outside of the crawler track 5a or the right outside of the crawler track 5b (the midpoint in the traveling body-side current state update line Lc_n). The position information on the traveling body-side current state update line Lc_n, that is, the coordinates in the global coordinate system COG constitutes the traveling body position information. According to the second method, even if the movement direction FD cannot be obtained, it is possible to suppress a decrease in accuracy of the traveling body position information by using the previously obtained traveling body-side current state update line Lc_n.

The third method is applied when Mv≤Mvc and the traveling body-side current state update line Lc is not generated. In this case, as illustrated in FIG. 14, the traveling body position information generation part 91B generates as a new traveling body-side current state update line Lc a straight line that moves in a direction orthogonal to a straight line LTD extending in the front-back direction of the upper swing body 3 (hereinafter, referred as appropriate to as front-back direction), passes through the swing center position P4, and is parallel to the Xa-Ya plane in the vehicle main body coordinate system COM. The traveling body-side current state update line Lc_n passes through the swing center axis Zr at a position of Wc/2 from the left outside of the crawler track 5a or the right outside of the crawler track 5b (the midpoint in the traveling body-side current state update line Lc). The front-back direction LTD is parallel to the Ya axis of the vehicle main body coordinate system COM. The position information on the traveling body-side current state update line Lc, that is, the coordinates in the global coordinate system COG constitutes the traveling body position information. According to the third method, it is possible to generate the traveling body position information even if the movement direction FD cannot be obtained and the existing traveling body-side current state update line Lc does not exist. As in the foregoing, the traveling body position information generation part 91B generates the traveling body position information according to the movement direction in which the excavator 100 travels. Next, a method for determining the work machine position information will be described.

The work machine position information generation part 91A illustrated in FIG. 5 generates as the work machine-side current state update line Lb a straight line that is parallel to an edge line of the plurality of edges 8B in the bucket 8 and is equivalent to the bucket width Wb. The work machine-side current state update line Lb coincides with the center of the blade edge line, at the midpoint thereof, that is, at the position of Wb/2 from the right and left ends of the bucket 8. In the example illustrated in FIG. 15, of blades 8Ba, 8Bb, 8Bc, 8Bd, and 8Be, the top part of the blade 8Bc, that is, the blade edge 8T of the blade 8Bc located at the middle coincides with the midpoint of the work machine-side current state update line Lb. The middle of the blade edge line is located at the blade edge position P3 as described below. The work machine position information generation part 91A may determine the blade edge position P3 of the blade edge 8Bc, and generate as the work machine-side current state update line Lb a line extended from the blade edge position P3 by Wb/2 to the right and left sides of the bucket 8. The thus determined position information on the work machine-side current state update line Lb, that is, the coordinates in the global coordinate system COG constitutes the work machine position information. By setting the work machine-side current state update line Lb as the work machine position information, it is possible to accurately determine the position information on the construction target constructed by the work machine 2, more specifically, by the bucket 8, that is, the construction results.

In the embodiment, if there occurs a change in the construction position information due to the excavation by the bucket 8 or the traveling of the excavator 100, the construction position information generation part 91C updates the construction position information to the latest information. While the excavator 100 travels, the work machine 2 is generally stopped. In some cases, however, the excavator 100 may travel with the work machine 2 being operated. This is because the operator operates the work machine operation members 31L and 31R while operating the traveling operation members 33L and 33R such that the work machine 2 moves in the air but does not excavate the construction target. In such cases, if the work machine position information is set as construction position information, the construction position information may be updated although the work machine 2 does not conduct excavation work, which leads to a decrease in accuracy of the construction position information. In the embodiment, the construction position information generation part 91C does not use the work machine position information during travel of the excavator 100 but uses the traveling body position information as the construction position information. Accordingly, it is possible to obtain the correct construction position information while the excavator 100 travels with the work machine 2 being operated. In addition, while the excavator 100 is stopped, the work machine 2 conducts excavation work or the like. In this case, the construction position information generation part 91C can use the work machine position information as the construction position information so as to incorporate the results of excavation of the construction target by the work machine 2 into the construction position information.

Figure 16:
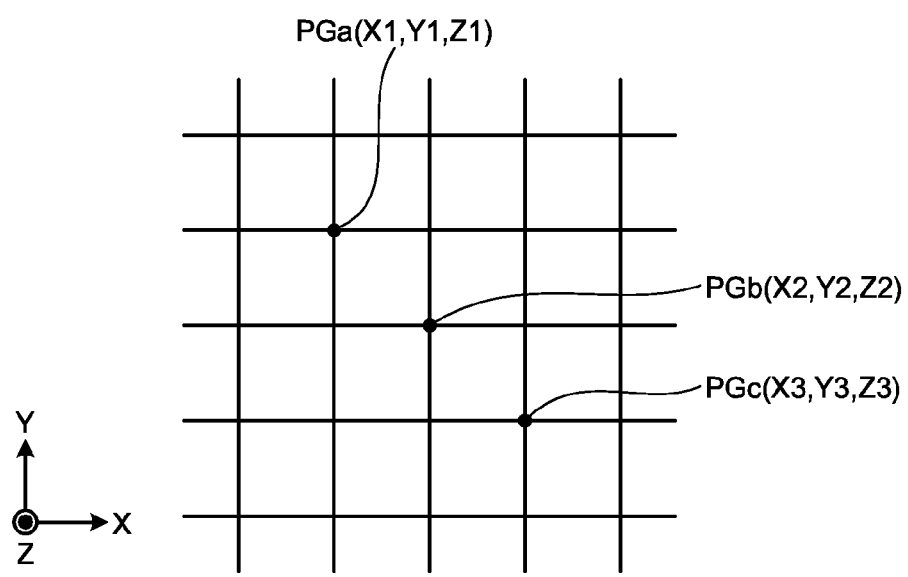
FIG. 16 is a diagram for describing updating of construction position information.
Figure 17:
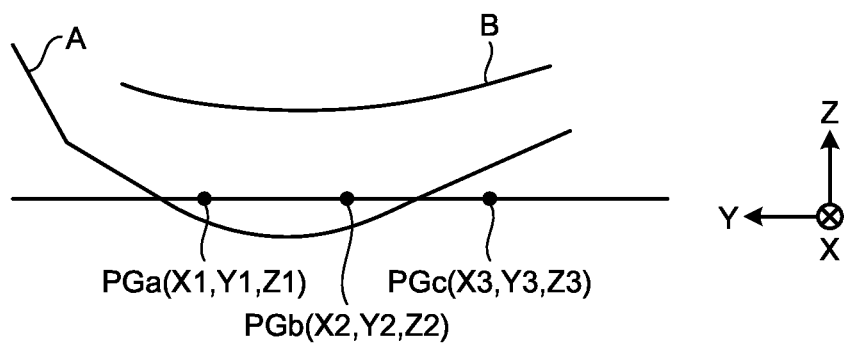
FIG. 17 is a diagram describing updating of construction position information.

FIGS. 16 and 17 are diagrams for describing update of the construction position information. The grid lines in FIGS. 16 and 17 are drawn in the global coordinate system COG {X, Y, Z} to indicate the position information of the construction target, that is, the position of the construction target. For example, there exists landform data on the construction target at intersections of a plurality of straight lines moving in X direction and a plurality of straight lines moving in Y direction (hereinafter, referred as appropriate to as construction target positions). It is assumed that the bucket 8 of the excavator 100 conducts excavation work at a construction target position PGa (X1, Y1, Z1) and a construction target position PGb (X2, Y2, Z2) but does not conduct excavation work at construction position coordinates PGc (X3, Y3, Z3), for example. The locus of the blade edges 8T in this case is indicated by A (refer to FIG. 17). The locus A also constitutes the locus of movement of the foregoing work machine-side current state update line Lb. In this case, the absolute value of the locus A in the height direction, that is, in Z direction is smaller than the construction target positions PGa and PGb, and thus a new plane is generated by excavating the construction target. The smaller value of the Z coordinate means that the landform resides nearer the underground side. Thus, when the absolute value of the locus A in the Z direction is smaller than the value of the Z coordinate of the construction target position (Z1 or Z2 in the foregoing example), the construction target is excavated by the construction work. The construction position information generation part 91C illustrated in FIG. 5 sets the work machine position information generated by the work machine position information generation part 91A as new construction position information, and updates the values of the construction target positions PGa and PGb. In this case, only the Z coordinate changes and thus the value of the Z coordinate is updated.

FIG. 17 indicates a locus B of the bucket 8 in the excavator 100 that moves above the construction target position and does not excavate the construction target. The locus B also constitutes the locus of the work machine-side current state update line Lb described above. In this case, the absolute value of the locus B in the Z direction is larger than the construction target positions PGa, PGb, and PGc, and thus no new plane by excavation of the construction target is generated. In this case, the construction position information generation part 91C illustrated in FIG. 5 does not update the values of the construction target positions PGa, PGb, and PGc. That is, the construction target positions PGa, PGb, and PGc as construction position information from the previous processing period are maintained. As in the foregoing, in the case of using the work machine position information, when the current work machine position information generated by the work machine position information generation part 91A becomes smaller than the position in the existing construction position information in the height direction, the construction position information generation part 91C updates the construction position information to the current work machine position information.

It is assumed that, while the excavator 100 is stopped, the operator operates the work machine operation members 31L and 31R to move the bucket 8 in the air. In this case, the determined work machine-side current state update line Lb has a larger value than the value of the coordinate in the Z direction indicated by the construction target position, and thus the construction position information is not updated. However, if the bucket 8 is moved in the air at a place without information on the construction target position, the construction position information generation part 91C may generate the construction position information according to the movement. When the excavator 100 is stopped and the work machine 2 is not operated but only the engine is driven, the construction position information is not updated.

It is assumed that the excavator 100 travels through the construction target positions PGa, PGb, and PGc. In this case, the foregoing traveling body-side current state update line Lc passes through the construction target positions PGa, PGb, and PGc. In this case, the construction position information generation part 91C illustrated in FIG. 5 sets as new construction position information the traveling position information generated by the traveling body position information generation part 91B during the travel, and updates all the values of the construction target positions PGa, PGb, and PGc. During the travel of the excavator 100, all the values of the construction target positions PGa, PGb, and PGc are updated to the latest construction position information, regardless of a change in the Z coordinate. Specifically, in the embodiment, in the case of using the traveling body position information, the construction position information generation part 91C updates the construction position information to the current traveling body position information generated by the traveling body position information generation part 91B.

In the foregoing example, there exists landform data of the construction target, that is, the construction target positions. However, the construction position information generation part 91C can update the construction position information even if there exist no values of the Z coordinates of the construction target positions or there exists none of coordinates of the construction target positions. For example, if there exists no values of the Z coordinates of the construction target positions, when the bucket 8 excavates the construction target or the excavator 100 travels, the construction position information generation part 91C can add construction position information obtained from the Z coordinate of the work machine-side current state update line Lb or the traveling body-side current state update line Lc at that time as new construction position information to the construction target positions. In addition, even if there exist no values of the X, Y, and Z coordinates of the construction target positions, when the bucket 8 excavates the construction target or the excavator 100 travels, the construction position information generation part 91C can add construction position information obtained from the X, Y, and Z coordinates of the work machine-side current state update line Lb or the traveling body-side current state update line Lc at that time as new construction position information to the construction target positions.

<Example of Operations of a Construction Management Device>

Figure 18:
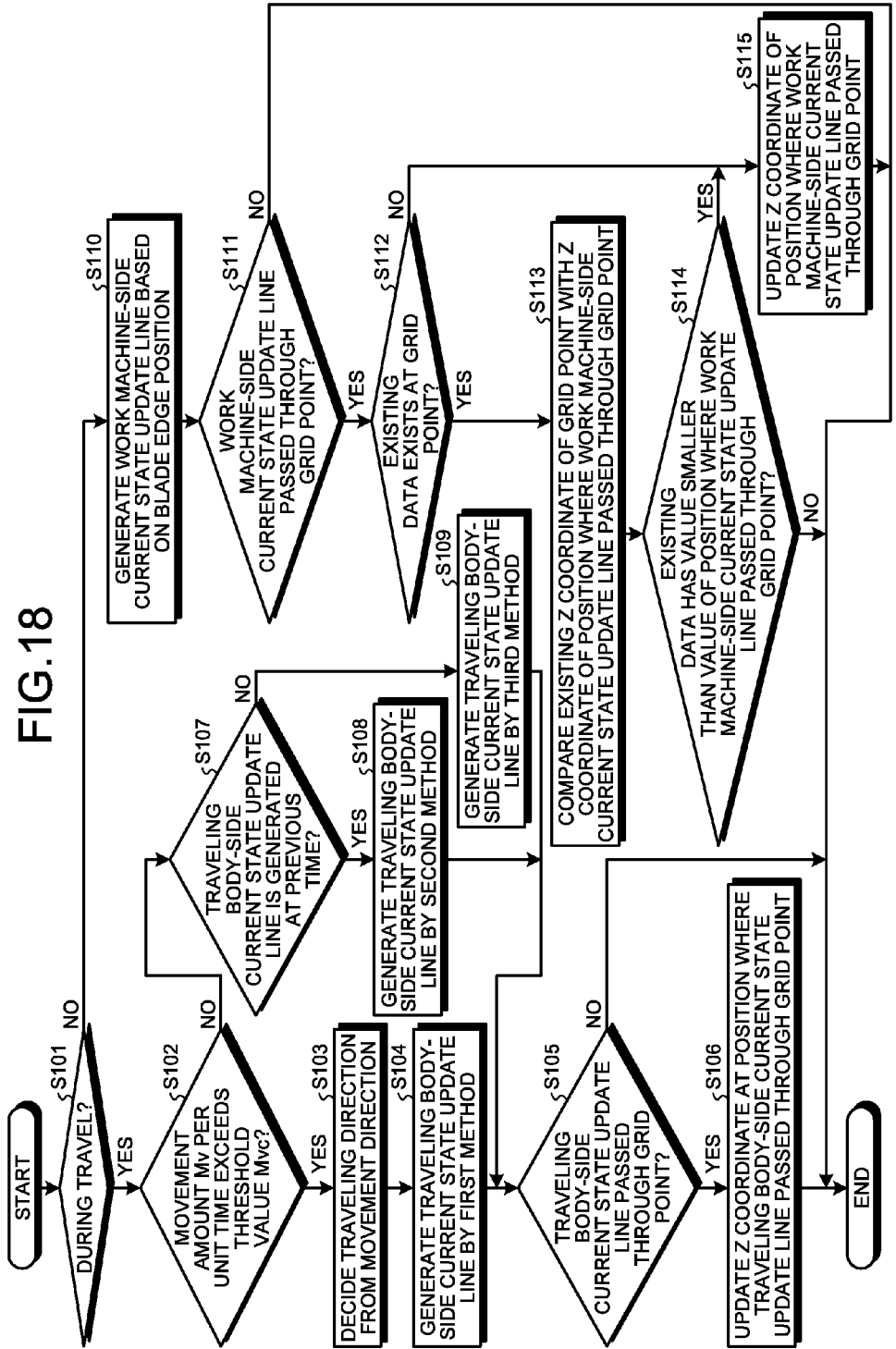
FIG. 18 is a flowchart of one example of operations of a construction management device according to the embodiment.

FIG. 18 is a flowchart of one example of operations of a construction management device according to the embodiment. At step S101, while the excavator 100 is traveling (step S101: Yes), the processing part 91 of the construction management device 90 illustrated in FIG. 5 moves the process to step S102. Whether the excavator 100 is traveling is determined on whether at least one of the hydraulic sensors 37Slf, 37Slb, 37Srf, and 37Srb detects that the traveling operation members 33L and 33R illustrated in FIG. 4 are operated to travel the traveling device 5 of the excavator 100.

Specifically, when at least one of the hydraulic sensors 37Slf, 37Slb, 37Srf, and 37Srb detects that an operation is performed to travel the traveling device 5 of the excavator 100, the hydraulic sensors 37Slf, 37Slb, 37Srf, and 37Srb illustrated in FIG. 4 detect a raise in pilot pressures. If the detected pilot pressures are higher than a predetermined threshold value, operating oil is supplied to the traveling hydraulic motor 5c and either one of the crawler tracks 5a and 5b is driven to travel the excavator 100. If the pilot pressures detected by the hydraulic sensors 37Slf, 37Slb, 37Srf, and 37Srb are equal to or smaller than the predetermined threshold value, the traveling device 5 of the excavator 100 is stopped or remains stopped. When the pilot pressures become equal to or less than the predetermined threshold value, the supply of operating oil is stopped to the traveling hydraulic motor 5c, and the excavator 100 is stopped.

That is, when the pilot pressures detected by the hydraulic sensors 37Slf, 37Slb, 37Srf, and 37Srb are higher than the predetermined threshold value, it can be determined that the excavator 100 is traveling. When the pilot pressures detected by the hydraulic sensors 37Slf, 37Slb, 37Srf, and 37Srb become equal to or less than the predetermined threshold value, it can be determined that the excavator 100 is stopped. If at least one of the pilot pressures detected by the four hydraulic sensors 37Slf, 37Slb, 37Srf, and 37Srb exceeds the predetermined threshold value, the processing part 91 determines that the excavator 100 is traveling. If all of the pilot pressures detected by the four hydraulic sensors 37Slf, 37Slb, 37Srf, and 37Srb are equal to or less than the predetermined threshold value, the processing part 91 determines that the excavator 100 is stopped. By using the pilot pressures as described in the foregoing, the processing part 91 can easily determine whether the excavator 100 is traveling or stopped.

At step S102, if the movement amount My of the excavator 100 per unit tine exceeds the predetermined threshold value Mvc (step S102: Yes), the traveling body position information generation part 91B of the processing part 91 moves the process to step S103. At step S103, the traveling body position information generation part 91B determines the movement direction FD of the excavator 100 by the foregoing method. At step S104, the traveling body position information generation part 91B generates the traveling body-side current state update line Lc by the first method described above. Next, moving to S105, if the traveling body-side current state update line Lc passes through the construction target positions at a grid (grid points illustrated in FIG. 16) representing landform data of the construction target in the global coordinate system COG (step S105: Yes), the traveling body position information generation part 91B moves the process to step S106. At step S106, when the traveling body-side current state update line Lc passes through a grid point, the construction position information generation part 91C of the processing part 91 updates the Z coordinate of the grid point to the Z coordinate of the traveling body-side current state update line Lc. Specifically, the construction position information generation part 91C generates construction position information using the traveling body-side current state update line Lc as the traveling body position information, and updates the values of the grid points. If the traveling body-side current state update line Lc does not pass through any grid point (step S105: No), the processing part 91 terminates one processing period and moves to the next processing period.

Then, returning to step S102, if the movement amount My of the excavator 100 per unit time is equal to or less than the predetermined threshold value Mvc (step S102: No), the traveling body position information generation part 91B of the processing part 91 moves the process to step S107. At step S107, if the traveling body-side current state update line Lc was generated in the previous processing period (step S107: Yes), the traveling body position information generation part 91B moves the process to step S108. At step S108, the traveling body position information generation part 91B generates the traveling body-side current state update line Lc by the second method described above. After that, the processing part 91 executes steps S105 and S106.

At step S107, if the traveling body-side current state update line Lc was not generated in the previous processing period (step S107: No), the traveling body position information generation part 91B moves the process to step S109. At step S109, the traveling body position information generation part 91B generates the traveling body-side current state update line Lc by the third method described above. After that, the processing part 91 executes steps S105 and S106.

Then, returning to step S101, if the excavator 100 is not traveling at step S101 (step S101: No), the processing part 91 moves the process to step S110. At step S110, the work machine position information generation part 91A of the processing part 91 generates the work machine-side current state update line Lb according to the blade edge position P3. Next, moving to step S111, if the work machine-side current state update line Lb passes through a grid point (step S111: Yes), the work machine position information generation part 91A moves the process to step S112. At step S112, if there already exists data on the construction target positions (step S112: Yes), the work machine position information generation part 91A moves the process to step S113.

At step S113, the work machine position information generation part 91A compares the Z coordinate of data on the construction target position existing at a grid point with the Z coordinate of the work machine-side current state update line Lb at the grid point. Then, moving to step S114, if it is determined as a result of the comparison that the Z coordinate of the work machine-side current state update line Lb has a smaller value than that of the Z coordinate of the data on the construction target position existing at the grid point (step S114: Yes), the work machine position information generation part 91A moves the process to step S115. At step S115, when the work machine-side current state update line Lb passes through a grid point, the construction position information generation part 91C updates the Z coordinate of the grid point to the Z coordinate of the work machine-side current state update line Lb. Specifically, the construction position information generation part 91C uses the work machine-side current state update line Lb as the work machine position information to generate the construction position information, and update the value of the Z coordinate of the grid point.

Next, returning to step S111, if the work machine-side current state update line Lb does not pass through any grid point (step S111: No), the processing part 91 terminates one processing period and moves to the next processing period. Then, returning to step S112, if there is no existing data on the construction target positions at step S112 (step S112: No), the work machine position information generation part 91A moves the process to step S115. At step S115, when the work machine-side current state update line Lb passes through a grid point, the construction position information generation part 91C updates the Z coordinate of the grid point to the Z coordinate of the work machine-side current state update line Lb. Then, returning to step S114, if the Z coordinate of the work machine-side current state update line Lb has a larger value than that of the Z coordinate of the existing data at the grid point (step S114: No), the processing part 91 terminates one processing period and moves to the next processing period.

By the foregoing process, the construction position information of the excavator 100 is updated to the latest information. The updated construction position information is temporarily stored in the storage part 92 of the construction management device 90 and then read to outside from the storage part 92 after the construction work of each day or at a predetermined timing during the construction work. The read construction position information is downloaded in a wired manner from the storage part 92 of the construction management device 90 and saved in a storage medium or saved in a data server or the like via a communication line at a management facility outside the excavator 100.

The construction management device 90 may be provided with a USB (universal serial bus) terminal not illustrated so that a USB memory as a storage medium can be connected to the USB terminal to download the construction position information. Alternatively, the construction management device 90 may be provided with an SD (secure digital) memory card slot so that an SD memory card as a storage medium can be used to download the construction position information.

The construction management device 90 may display the generated construction position information together with the designed landform data of the construction target, for example, in a graphic form on the display part 42 of the display input device 38 of the display system 28. Accordingly, the operator and the like of the excavator 100 can intuitively recognize the construction status in a visual manner. The operator and the like of the excavator 100 can also intuitively recognize insufficiently excavated places or places to be corrected in a visual manner. In addition, the operator and the like of the excavator 100 can easily and quickly confirm the progress of the construction work of the construction target at a construction site.

Figure 19:
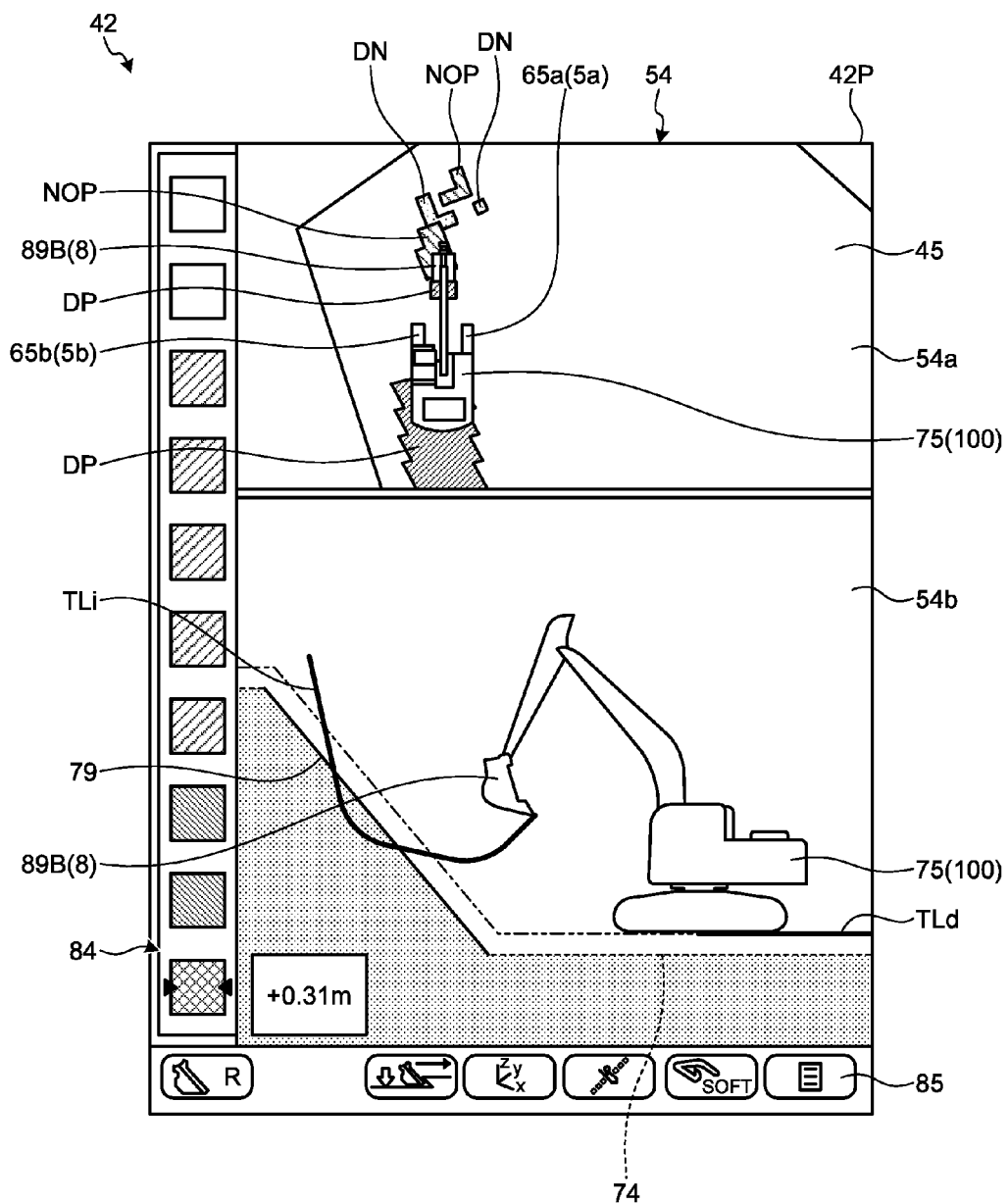
FIG. 19 is a diagram of one example of construction position information displayed on the screen 42P of the display part 42.

FIG. 19 is a diagram of one display example of construction position information on the screen 42P of the display part 42. The display is provided while the operator conducts the excavation work. Alternatively, the display can be configured such that another screen is displayed during excavation work and can be shifted to the foregoing screen by the operator touching a predetermined place (for example, menu button 85) on the screen 42P. The foregoing display includes a distribution chart of construction position information in which construction result information as construction results is displayed in the form of a distribution chart. Displayed at a side view part 54b are a target line 79 and solid lines indicated with reference signs TLi and TLd. The locus TLi of the blade edge 8T of the bucket 8 (icon 89B) is displayed as construction results, and the locus TLd of the crawler tracks 5a and 5b is displayed by a solid line.

A front view part 54a presents a distribution chart of construction position information. In a region indicated with reference sign NOP, the bucket 8 (icon 89B) moves over a target construction plane, that is, the target plane, but does not conduct excavation work. In a region indicated with reference sign DP, the target plane is excavated and has construction results equivalent to the target construction plane. In a region indicated with reference sign DN, the target plane is excavated too deeply. Here, the region with reference sign DN is displayed in different colors to indicate the degrees of depths of excavation, for example. Places excavated more deeply than a predetermined threshold value are displayed in blue, for example, and places excavated less deeply than the predetermined threshold value are displayed in light blue, for example. The kinds or number of colors according to the degrees of depths of excavation can be arbitrarily set by touching a predetermined place (for example, menu button 85) on the display to call a setting screen. By displaying the construction results in the form of a distribution chart on the screen 42P of the display part 42 as described above, the operator can intuitively confirm the construction results in a visual manner. In addition, such distribution chart can also be displayed in the same mode on a display device of a construction management system described later.

Instead of the construction position information distribution chart in a display of construction results, on the basis of the number of times when the estimated current state update line passes through grid points at step S105 or step S111 as illustrated in FIG. 18, a distribution chart according to the number of times, that is, a number-of-construction distribution chart may be displayed in the front view part 54a of the screen 42P of the display part 42. For example, construction places with a predetermined number of times or more are displayed in red, and construction places with a number of times less than the predetermined number of times are displayed in blue. The number of colors used for color coding in the number-of-construction distribution chart, that is, the kinds of colors are not limited to two but may be three or more. The kinds of colors used in the construction position information distribution chart and the number-of-construction distribution chart are presented in graphic information 84 at the left end of the screen 42P. In addition, the kinds and number of colors according to the number of constructions in the number-of-construction distribution chart can be arbitrarily set by touching a predetermined place (for example, menu button 85) to call a setting screen.

A process of displaying a number-of-construction distribution chart on the screen 42P of the display part 42 will be described using a flowchart of one example of operations of the construction management device described above. The number of processes performed at step S105 or step S111 is counted and stored in the storage part 92. The display processing part 44 may display a distribution chart according to the number of processes in a graphic form, instead of displaying the construction position information distribution chart in a graphic form as illustrated in FIG. 19. Specifically, the display processing part 44 counts the number of times when the traveling body-side current state update line has passed through grid points (the number of times when it has been affirmatively determined at step S105) or the number of times when the work machine-side current state line has passed through grid points (the number of times when it has been affirmatively determined at step S111), during the construction work of each day, for example. Then, the display processing part 44 displays a distribution chart of places to be constructed in different colors in a graphic form according to the number of the counted times. The operator and others can visually check the graphic display and know the number of times when the construction target is constructed. In addition, the operator and others can intuitively grasp the construction status from the graphic display indicating the number of construction works. When the operator touches a predetermined place (for example, menu button 85) on the input part 41, the screen transition takes place at the display part 42. Thus, the operator can display either the construction position information distribution chart illustrated in FIG. 19 or the foregoing of number-of-construction distribution chart, on the display part 42.

<Construction Management System 200>

FIG. 20 is a diagram of a construction management system 200 according to the embodiment. The construction management system 200 manages the construction status by excavators 100A and 100B including the foregoing construction management devices 90. A single excavator 100 or a plurality of excavators 100 may be managed. If a plurality of excavators 100 is managed, the excavators 100 may work at one and the same construction site or different construction sites. The construction management system 200 has a data server 203 connected to a communication line 201.

The communication line 201 is connected to a base station 202 for wireless communications with the excavators 100A and 100B via antennas 40A and 40B. The wireless communications may be terrestrial communications or satellite communications. In the embodiment, the data server 203 is connected to the communication line 201 in a wired manner. However, the data server 203 may communicate with the communication line 201 in a wireless manner. The communication line 201 may be an Internet connection line. In addition, the communication line 201 and the base station 202 may be structured by a wireless LAN system in a construction site such that the data server 203 and a display device 206 are placed at an office in a construction site or the like.

The data server 203 includes a processing part 204 and a storage part 205. The processing part 204 has a construction plan creation part 204A, a construction plan transmission part 204B, and a construction position information acquisition part 204C. The data server 203 is connected to the display device 206. The processing part 204 is a computer including a CPU and others. The storage part 205 includes at least one of a RAM and a ROM. The construction plan creation part 204A creates construction plans for the excavators 100A and 100B. The construction plan creation part 204A creates designed planes on construction targets to be constructed by the excavator 100A and 100B, and stores the same in the storage part 205, for example. The construction plan transmission part 204B transmits the construction plans created by the construction plan creation part 204A, that is, designed landform data, to the construction management devices 90 of the excavators 100A and 100B via the communication line 201. The construction position information acquisition part 204C acquires the construction position information generated by the construction management devices 90 of the excavators 100A and 100B via the communication line 201.

The data server 203 included in the construction management system 200 acquires the construction position information from the excavators 100A and 100B and stores the same in the storage part 205, thereby to manage the daily progress of the construction work. The data server 203 may also display the construction position information acquired from the excavators 100A and 100B in a graphic form on the display device 206 as illustrated in FIG. 19. Accordingly, the data server 203 can display the progress of the construction work in an easy-to-understand manner, which allows the manager to easily grasp the progress of the construction work. The manager can also use the construction management system 200 to allow the data server 203 to acquire the construction position information generated by the construction management devices 90 in real time. The manager can use the construction position information acquired in real time to quickly provide the operators of the excavators 100 with instructions for the next works and construction plans. On the provision of instructions and construction plans, the construction plan creation part 204A generates new designed landform data, and the construction plan transmission part 204B transmits the same via the communication line 201 to the construction management devices 90 of the excavators 100A and 100B. Accordingly, it is possible to present the operators new construction plans (designed landform data) in a quick and correct manner as compared to the case of using telephone communications or face-to-face communications.

As described in the foregoing, during travel of the excavator 100, the construction management device 90 uses the traveling body position information on the position of the traveling device 5, not the work machine position information on the position of the work machine 2, to generate construction position information equivalent to results of construction by the excavator 100. Thus, even if the work machine 2 is operated during travel of the excavator 100, the construction management device 90 uses only the traveling body position information to generate data on results of construction by the excavator 100. Accordingly, it is possible to prevent that the construction management device 90 uses the work machine position information even though the work machine 2 is not operated for the excavator during travel of the excavator 100. During travel of the excavator 100, the construction management device 90 uses only the traveling body position information on the correct construction results of the excavator 100 to generate data on results of construction by the excavator 100. Thus, the construction management device 90 can determine accurately the results of construction, that is, the changed shape of the construction target, in a reliable and quick manner, at computerized construction work using the excavator 100 as excavation machinery with the work machine 2.

Use of the construction management device 90 eliminates the need for land survey after the construction, which reduces the trouble of conducting survey work. In the case of using the work machine position information, if the height of the work machine becomes lower than the current state, the construction management device 90 updates the construction position information to the latest information, and then updates the construction position information each time new traveling body position information is generated. Accordingly, the construction management device 90 can acquire the shape of the construction target in real time. The manager can use the construction position information generated by the construction management device 90 to quickly provide the operator of the excavator 100 with instructions for next works and construction plans.

In the case of excavation work using the work machine 2, the excavator 100 performs excavation at a fixed position in many cases. In such construction, it is not possible to acquire construction position information according to movement of the excavator 100. Thus, during the excavation, the construction management device 90 uses work machine position information on the position of the work machine 2 to generate data on results of construction by the excavator 100. Accordingly, the construction management device 90 can determine the results of construction with accuracy even when the excavator 100 excavates at a fixed position. That is, the construction management device 90 can generate the construction position information in a reliable and correct manner even when the excavator 100 does not travel but conducts construction work such as excavation using the work machine 2.

If an attempt is made to acquire data on results of construction only depending on a GNSS or GPS, when the excavator 100 travels at a low speed, the excavator 100 may be determined as being stopped due to the limit of sensing capability of a GPS sensor, thereby causing errors in the construction position information. Especially, the excavator 100 travels at a lower speed than passenger vehicles and other construction machines such as wheel loaders or dump trucks. There is thus a higher possibility that errors occur in the construction position information at the excavator 100. Specifically, in places where the excavator 100 travels at a low speed, the construction position information may include information indicating no execution of construction or outdated data on construction results.

In the embodiment, the construction position information is generated using either the work machine position information or the traveling body position information, depending on whether the traveling operation members 33L and 33R as operation levers (or pedals) are operated as traveling levers according to the will of the operator of the excavator 100. Accordingly, it is possible to detect the travel and stoppage of the excavator 100 in a reliable manner. As a result, it is possible to reliably detect execution of the construction, even based on the construction position information on places where the excavator 100 travels at a low speed, and it is possible to reliably update the old data on results of construction.

The construction management device 90 can set both planes excavated and not excavated by the excavator 100 as an entire construction site, and update the construction position information to the latest information, thereby to acquire the latest landform data at the construction site. In addition, when the excavator 100 travels through the construction site or excavates the construction site by the work machine 2, the construction management device 90 can use either the work machine position information or the traveling body position information as construction position information, thereby to keep updating the landform data at the construction site to the latest landform data.

As in the foregoing, the embodiment of the present invention is described. However, the embodiment is not limited to the foregoing description. In addition, the foregoing constitutional elements include elements capable of being readily conceived by a person skilled in the art, virtually identical elements, and so-called equivalent elements. Further, the foregoing constitutional elements can be combined as appropriate. The constitutional elements can be omitted, replaced, or changed without deviating from the gist of the embodiment. For example, the work machine 2 has the boom 6, the arm 7, and the bucket 8, but parts attached to the work machine 2 are not limited to these components or are not limited to the bucket 8.

REFERENCE SIGNS LIST

1 Vehicle main body
2 Work machine
3 Upper swing body
5 Traveling device
5*a* and 5*b* Crawler track
5*c* Hydraulic motor
8 Bucket
8B Blade
8T Blade edge
9 Posture detection part
16 First stroke sensor
17 Second stroke sensor 18 Third stroke sensor
19 Position detection part
21 and 22 Antenna (GNSS antenna)
23 Three-dimension position sensor
25 Operating device
27 Vehicle control device
31L and 31R Work machine operation member
32L and 32R Work machine operation detection part
33L and 33R Traveling operation member
34L and 34R Traveling operation detection part
37D Traveling control valve
37W Working control valve
37Slf, 37Slb, 37Srf, and 37Srb Hydraulic sensor
37SBM, 37SBK, 37SAM, and 37SRM Hydraulic sensor
38 Display input device
39 Display control device
40 Communication part
40A Antenna
45 Designed plane
70 Target plane
90 Construction management device in excavation machinery (construction management device)
91 Processing part
91A Work machine position information generation part
91B Traveling body position information generation part
91C Construction position information generation part
92 Storage part
100, 100A, and 100B Excavator
200 Construction management system
203 Data server
204 Processing part
204A Construction plan creation part
204B Construction plan transmission part
204C Construction position information acquisition part
205 Storage part
CC Ground contact plane
COG Global coordinate system
COM Vehicle main body coordinate system
FD Movement direction
Lb Work machine-side current state update line
Lc and Lc_n Traveling body-side current state update line
LTD Front-back direction
My Movement amount
P1 and P2 Installation position
P3 Blade edge position
P4 and P4_m Swing center position
Zr Swing center axis

The invention claimed is:

1. A construction management device for excavation machinery configured to generate information on a result of construction by the excavation machinery having a work machine, a swing body to which the work machine is attached, and a traveling body traveling with the swing body mounted thereon, the device comprising:
a vehicle state detection part that detects information on current position and posture of the excavation machinery;
a work machine position information generation part that determines work machine position information as information on a position of the work machine, based on a result of a detection by the vehicle state detection part;
a traveling body position information generation part that determines traveling body position information as information on a position of the traveling body, based on the result of the detection by the vehicle state detection part; and
a construction position information generation part that uses one of the work machine position information and the traveling body position information to generate construction position information as information on a position of construction by the excavation machinery, wherein when the excavation machinery travels, the construction position information generation part uses not the work machine position information, but the traveling body position information to generate the construction position information,
wherein when the traveling body is stopped, the construction position information generation part uses the work machine position information to generate the construction position information.

2. The construction management device for excavation machinery according to claim 1, wherein the construction position information generation part displays the construction position information on a display device included in the excavation machinery.

3. The construction management device for excavation machinery according to claim 1, further comprising:
an operation part that controls an operation of the traveling body and an operation detection part that detects an operation of the operation part, wherein
when the operation detection part detects an operation for traveling the traveling body, the construction position information generation part uses the traveling body position information to generate the construction position information, and when the operation detection part detects an operation for stopping the traveling body, the construction position information generation part uses the work machine position information to generate the construction position information.

4. The construction management device for excavation machinery according to claim 3, wherein the operation part includes a pilot-pressure operation lever or pedal.

5. The construction management device for excavation machinery according to claim 1, wherein
when using the work machine position information to generate the construction position information, when current work machine position information generated by the work machine position information generation part becomes smaller than the position of the construction position information in a height direction, the construction position information generation part updates the construction position information to the current work machine position information.

6. The construction management device for excavation machinery according to claim 1, wherein
when using the travel body position information to generate the construction position information, the construction position information generation part updates the construction position information to current traveling position information generated by the traveling body position information generation part.

7. The construction management device for excavation machinery according to claim 1, wherein the work machine position information refers to information on a position of a blade edge of a bucket attached to the work machine.

8. The construction management device for excavation machinery according to claim 1, wherein the traveling body position information generation part generates the traveling body position information, based on a movement direction in which the excavation machinery travels.

9. Excavation machinery, comprising:
a work machine;
a swing body to which the work machine is attached;

a traveling body that travels with the swing body mounted thereon; and the construction management device for excavation machinery according to claim 1.

10. A construction management system, comprising:

a construction plan creation part that creates a construction plan for the excavation machinery according to claim 9;

a construction plan transmission part that transmits the construction plan to the construction management device in the excavation machinery; and a construction position information acquisition part that acquires the construction position information generated by the construction management device in the excavation machinery.

11. A construction management device for excavator, configured to generate information on a result of construction by the excavator having a work machine, a swing body to which the work machine is attached, and a traveling body traveling with the swing body mounted thereon, the device comprising:

a vehicle state detection part that detects information on current position and posture of the excavator;

a work machine position information generation part that determines work machine position information as information on a position of the work machine, based on a result of a detection by the vehicle state detection part;

a traveling body position information generation part that determines traveling body position information as information on a position of the traveling body, based on the result of the detection by the vehicle state detection part;

a pilot-pressure traveling lever that controls an operation of the traveling body; and an operation detection part that detects an input to the traveling lever, wherein when the operation detection part detects an input for traveling the traveling body, a construction position generation information part uses the traveling body position information to generate a construction position information, and when the operation detection part detects an input for stopping the traveling body, the construction position generation information part uses the work machine position information to generate the construction position information.

* * * * *